(12) United States Patent  
Hasegawa

(10) Patent No.: US 6,486,972 B1  
(45) Date of Patent: Nov. 26, 2002

(54) VIDEO DATA TRANSFER APPARATUS

(75) Inventor: Hirokazu Hasegawa, Koganei (JP)

(73) Assignees: Casio Computer Co., Ltd., Tokyo (JP); Casio Electronics Manufacturing Co., Ltd., Iruma (JP)

( * ) Notice: Subject to any disclaimer, the term of this patent is extended or adjusted under 35 U.S.C. 154(b) by 0 days.

(21) Appl. No.: 09/139,703

(22) Filed: Aug. 25, 1998

(30) Foreign Application Priority Data

Aug. 29, 1997 (JP) .............................................. 9-235133

(51) Int. Cl.$^7$ ................................................. G06F 3/12
(52) U.S. Cl. ......................... 358/1.9; 358/515; 358/523
(58) Field of Search .......................... 358/1.2, 1.4, 1.5, 358/1.9, 1.12, 1.13, 1.14, 1.15, 1.16, 1.17, 1.11, 462, 518, 523, 538

(56) References Cited

U.S. PATENT DOCUMENTS 5,129,048 A * 7/1992 Ng ............................ 358/1.11
5,296,945 A * 3/1994 Nishikawa et al. ......... 358/518

* cited by examiner

Primary Examiner—Mark Wallerson
(74) Attorney, Agent, or Firm—Frishauf, Holtz, Goodman & Chick, P.C.

(57) ABSTRACT

Video data of yellow (Y), magenta (M), cyan (C) and black (K), stored in a DRAM, are transferred to an SRAM via a DMAC. The video data of yellow stored in the SRAM is transferred to a color printer engine by a DMAC for yellow. The video data of magenta stored in the SRAM is transferred to the color printer engine by a DMAC for magenta. The video data of cyan stored in the SRAM is transferred to the color printer engine by a DMAC for cyan. The video data of black stored in the SRAM is transferred to the color printer engine by a DMAC for black.

16 Claims, 13 Drawing Sheets

VIDEO DATA TRANSFER APPARATUS

BACKGROUND OF THE INVENTION

1. Field of the Invention

The present invention relates to a video data transfer apparatus, and, more particularly, to a video data transfer apparatus suitable for transferring video data to a printer engine from a frame memory.

2. Description of the Related Art

One conventional tandem type color printer is equipped with four independent video transfer circuits respectively associated with video data of yellow, magenta, cyan and black. In this printer, the individual video transfer circuits transfer video data to a printer engine from a frame memory.

FIG. 13 is a block diagram showing the schematic structure of a video transfer section of the conventional tandem type color printer. In the structure illustrated in FIG. 13, one frame of video data of yellow (Y), magenta (M), cyan (C) and black (K) are stored in a DRAM 101. The yellow video data is transferred to a color printer engine 106 by a DMAC (Dynamic Memory Access Controller) 102 for yellow (hereinafter called Y-DMAC 102). The magenta video data is transferred to the color printer engine 106 by a DMAC 103 for magenta (hereinafter called M-DMAC 103). The cyan video data is transferred to the color printer engine 106 by a DMAC 104 for cyan (hereinafter called C-DMAC 104). The black video data is transferred to the color printer engine 106 by a DMAC 105 for black (hereinafter called K-DMAC 105).

In a case of implementing fast video data transfer to permit a tandem type color printer having this structure and a resolution of, for example, 300 dpi to operate in burst mode (the operation mode to output four consecutive addresses in a single access), each of the Y-DMAC 102, the M-DMAC 103, the C-DMAC 104 and the K-DMAC 105 requires a data capacity of 32-bit latch×4 (quantity)×2 (lines).

If this scheme is applied to a high-resolution tandem type color printer with a resolution of, for example, 600 dpi, each of the Y-DMAC 102, the M-DMAC 103, the C-DMAC 104 and the K-DMAC 105 requires a data capacity of 64-bit latch×4 (quantity)×2 (lines). Therefore, the total capacity of the whole DMACs is 64-bit latch×4 (quantity)×2 (lines)×4 (colors) or 2048 bits.

The conventional tandem type color printer, as apparent from the above, requires that the capacity of each of the Y-DMAC 102, the M-DMAC 103, the C-DMAC 104 and the K-DMAC 105 should be increased in order to transfer video data fast to the color printer engine 106 from the DRAM 101 or adapt this printer to a high-resolution printer. This suffers an increase in the circuit scale.

If video data stored in the DRAM 101 has been compressed in advance, an expander or a decompressor should be provided at the previous stage of each of the Y-DMAC 102, the M-DMAC 103, the C-DMAC 104 and the K-DMAC 105. In this case, the circuit scale becomes larger.

A variation in the operation speeds of the Y-DMAC 102, the M-DMAC 103, the C-DMAC 104 and the K-DMAC 105, if any, results in an overrun error in which before the slowest one of the four DMACs completes the necessary operation, the other DMACs start the next operations.

SUMMARY OF THE INVENTION

Accordingly, it is an object of the present invention to provide a video data transfer apparatus capable of transferring video data fast while suppressing an increase in the circuit scale.

To achieve the above object, according to a first aspect of this invention, there is provided a video data transfer apparatus comprising:

a frame memory where plural pieces of video data representing images of different colors;

a video buffer for storing every predetermined amount of video data supplied thereto;

read control means for accessing the video buffer to read video data stored in the frame memory and representing images of individual colors, color by color, and supplying the read video data to the video buffer; and a plurality of video transfer means for accessing the video buffer and transferring those of the video data stored in the video buffer which represent images of different colors to a printer engine.

This structure can allow a plurality of video transfer means to share a single video buffer and make it unnecessary to provide a video buffer for each video transfer means. The use of a fast-readable video buffer therefore accomplishes fast transfer of video data to the printer engine while suppressing an increase in the circuit scale. If the frame memory is constituted by a DRAM, the use of, for example, an SRAM for the video buffer implements fast reading of video data.

According to a second aspect of this invention, there is provided a video data transfer apparatus for sequentially transferring each piece of video data representing each color component of an image having a plurality of colors to a printer engine for sequentially generating a transfer request for the each piece of video data and sequentially acquiring the each piece of video data supplied thereto, which apparatus comprises:

a frame memory for storing the each piece of video data representing the each color component;

a video buffer for storing every predetermined amount of video data supplied thereto;

video transfer means for accessing the video buffer and transferring the video data stored in the video buffer to the printer engine in a supply order of the video data to the video buffer, in response to the transfer request generated by the printer engine; and read control means for sequentially reading the video data, stored in the frame memory and representing images of individual colors, color by color, and accessing the video buffer to sequentially supply the read video data to the video buffer.

This structure can allow a plurality of video transfer means to share a single video buffer and make it unnecessary to provide a video buffer for each video transfer means. The use of a fast-readable video buffer therefore permits video data to be sequentially transferred fast to the printer engine while suppressing an increase in the circuit scale.

According to a third aspect of this invention, there is provided a video data transfer apparatus for transferring video data representing an image to a printer engine from a frame memory having an area for storing the video data, which apparatus comprises:

read address generation means for generating a read address for designating that of areas in the frame memory from which the video data is to be read out;

a video buffer having an area for storing a predetermined amount of video data;

write counter means for generating a write address for designating that of areas in the video buffer in which the video data is to be written;

write control means for, when generating an access request to the video buffer and access permission is granted, reading video data from the area in the frame memory indicated by the read address and writing the read video data in the area in the video buffer indicated by the write address;

read control means for, when generating an access request to the video buffer and access permission is granted, reading the video data from the video buffer;

read end signal generation means for generating a read end signal in response to reading of the predetermined amount of video data from the video buffer by the read control mans;

transfer means for transferring the video data read by the read control means to the printer engine;

write instruction means for generating an instruction to write next video data in the video buffer with respect to the write control means based on the read end signal; and access control means for granting access permission to one of the write control means and the read control means which have generated the access requests to the video buffer, the write control means having means generating the access request to the video buffer in response to the instruction generated by the write instruction means.

This structure can permit a plurality of read control means to share a single video buffer, thus making it possible to reduce the circuit scale needed to transfer data to the printer engine.

Even in a case where the access control means controls a plurality of accesses to the video buffer so as for a plurality of read control means to share a single video buffer, access collision to the video buffer can be prevented. This can ensure proper data transfer to the printer engine.

The time for reading video data from the frame memory is shortened by providing read address generation means for generating a read address for designating that of areas in the frame memory from which the video data is to be read out, and write counter means for generating a write address for designating that of areas in the video buffer in which the video data is to be written, and by transferring the video data, stored in the frame memory, directly to the video buffer. Therefore, the video data stored in the frame memory is transferred fast to the printer engine.

Further, the video data stored in the frame memory is sequentially supplied to the video buffer by generating a read end signal upon completion of the reading of the video buffer from the video buffer and by writing next video data in the video buffer based on this read end signal. This allows fast data transfer to the printer engine without delay.

According to one modification, the video data transfer apparatus may further comprise access control means for permitting the read control means and each of the video transfer means to access the video buffer based on an access requests generated by the read control means and each video transfer means; and wherein the read control means and each of the video transfer means may have means for gaining access to the video buffer when the access requests are generated and access to the video buffer is permitted.

With this structure, even in a case where the read control means and a plurality of video transfer means individually access the video buffer, collision of access to the video buffer by the read control means and access to the video buffer by the video transfer means can be avoided. This can ensure proper data transfer when a single video buffer is shared by a plurality of video transfer means.

According to another modification, the video data transfer apparatus may further comprise:

read address generation means for generating a read address for designating that of areas in the frame memory from which the video data is to be read out, and write counter means for generating a write address for designating that of areas in the video buffer in which the video data is to be written, the read control means may have means for reading that of the video data stored in the frame memory which is stored at the area indicated by the read address, and the video buffer may have means for storing video data supplied thereto in the area indicated by the write address. This structure shortens the time for reading video data from the frame memory. It is thus possible to transfer video data, stored in the frame memory, fast to the printer engine.

According to a further modification of the video data transfer apparatus, each of the video transfer means may have transfer end signal generation means for generating a transfer end signal in response to the predetermined amount of video data having been transferred from the video buffer; and the video buffer may have means for storing video data supplied thereto based on the transfer end signal.

With this structure, the video data stored in the frame memory is sequentially supplied to the video buffer, thus ensuring fast data transfer to the printer engine without delay.

According to a still further modification of the video data transfer apparatus, the video buffer may comprise:

means for securing areas for storing plural pieces of video data representing images of the same colors; and means for storing video data, supplied thereto, in an area other than those areas where video data whose transfer by the video transfer means has not been completed yet.

Therefore, data transfer to the printer engine can be implemented without delay by, during transfer of video data, writing video data of the same color as the video data being transferred.

According to a yet still further modification of the video data transfer apparatus, the read control means may have write detection means for detecting the video data having been supplied to the video buffer and generating a write end signal; and each of the video transfer means may have means for accessing the video buffer in response to the write end signal.

This structure executes data transfer to the printer engine immediately after data writing in the video buffer, so that data transfer to the printer engine is carried out without delay and an overrun error is avoided.

According to a still further modification, the video data transfer apparatus may further comprise means for supplying a signal instructing a transfer start to the printer engine; and when receiving the signal instructing the transfer start, the printer engine may start an operation for generating a transfer request in response to the signal.

According to a fourth aspect of this invention, there is provided a video data transfer method which comprises:

a frame storage step of storing plural pieces of video data representing images of different colors;

a buffer step of storing every predetermined amount of video data supplied;

a read control step of accessing the buffer step to read video data, stored by the frame storage step and representing images of individual colors, color by color, and supplying the read video data to the video buffer; and a plurality of video transfer steps of accessing the buffer step and transferring those of the video data stored by the buffer step which represent images of different colors to a printer engine.

This structure can allow a plurality of video transfer means to share a single video buffer and make it unnecessary to provide a video buffer for each video transfer means. The use of a fast-readable video buffer therefore accomplishes fast transfer of video data to the printer engine while suppressing an increase in the circuit scale.

According to a fifth aspect of this invention, there is provided a video data transfer method of sequentially transferring each piece of video data representing each color component of an image having a plurality of colors to a printer engine for sequentially generating a transfer request for the each piece of video data and sequentially acquiring the each piece of video data supplied thereto, which method comprises:

a frame storage step of storing the each piece of video data representing the each color component;

a buffer step of storing every predetermined amount of video data supplied;

a video transfer step of accessing the buffer step and transferring the video data stored by the buffer step to the printer engine in a supply order of the video data to the buffer step, in response to the transfer request generated by the printer engine; and a read control step of sequentially reading the video data, stored by the frame storage step and representing images of individual colors, color by color, and accessing the buffer step to sequentially supply the read video data to the buffer step.

This structure can allow a plurality of video transfer steps to share a single video buffer and make it unnecessary to provide a video buffer for each video transfer step. The use of a fast-readable video buffer therefore permits video data to be sequentially transferred fast to the printer engine while suppressing an increase in the circuit scale.

According to a sixth aspect of this invention, there is provided a video data transfer method of transferring video data representing an image to a printer engine from a frame storage step having an area for storing the video data, which method comprises:

a read address generation step of generating a read address for designating that of areas in the frame storage step from which the video data is to be read out;

a buffer step having an area for storing a predetermined amount of video data;

a write counter step of generating a write address for designating that of areas in the buffer step in which the video data is to be written;

a write control step of, when generating an access request to the buffer step and access permission is granted, reading video data from the area in the frame storage step indicated by the read address and writing the read video data in the area in the buffer step indicated by the write address;

a read control step of, when generating an access request to the buffer step and access permission is granted, reading the video data from the buffer step;

a read end signal generation step of generating a read end signal in response to reading of the predetermined amount of video data in the buffer step by the read control step;

a transfer step of transferring the video data read by the read control step to the printer engine;

a write instruction step of generating an instruction to write next video data in the buffer step with respect to the write control step based on the read end signal; and an access control step of granting access permission to one of the write control step and the read control step which have generated the access requests to the buffer step, the write control step having a step of generating the access request to the buffer step in response to the instruction generated by the write instruction step.

This structure can permit a plurality of read control means to share a single video buffer, thus making it possible to reduce the circuit scale needed to transfer data to the printer engine.

Even in a case where the access control means controls a plurality of accesses to the video buffer so as for a plurality of read control means to share a single video buffer, access collision to the video buffer can be prevented. This can ensure proper data transfer to the printer engine.

The time for reading video data from the frame memory is shortened by providing read address generation means for generating a read address for designating that of areas in the frame memory from which the video data is to be read out, and write counter means for generating a write address for designating that of areas in the video buffer in which the video data is to be written, and by transferring the video data, stored in the frame memory, directly to the video buffer. Therefore, the video data stored in the frame memory is transferred fast to the printer engine.

Further, the video data stored in the frame memory is sequentially supplied to the video buffer by generating a read end signal upon completion of the reading of the video buffer from the video buffer and by writing next video data in the video buffer based on this read end signal. This allows fast data transfer to the printer engine without delay.

DETAILED DESCRIPTION OF THE PREFERRED EMBODIMENT

Figure 1:
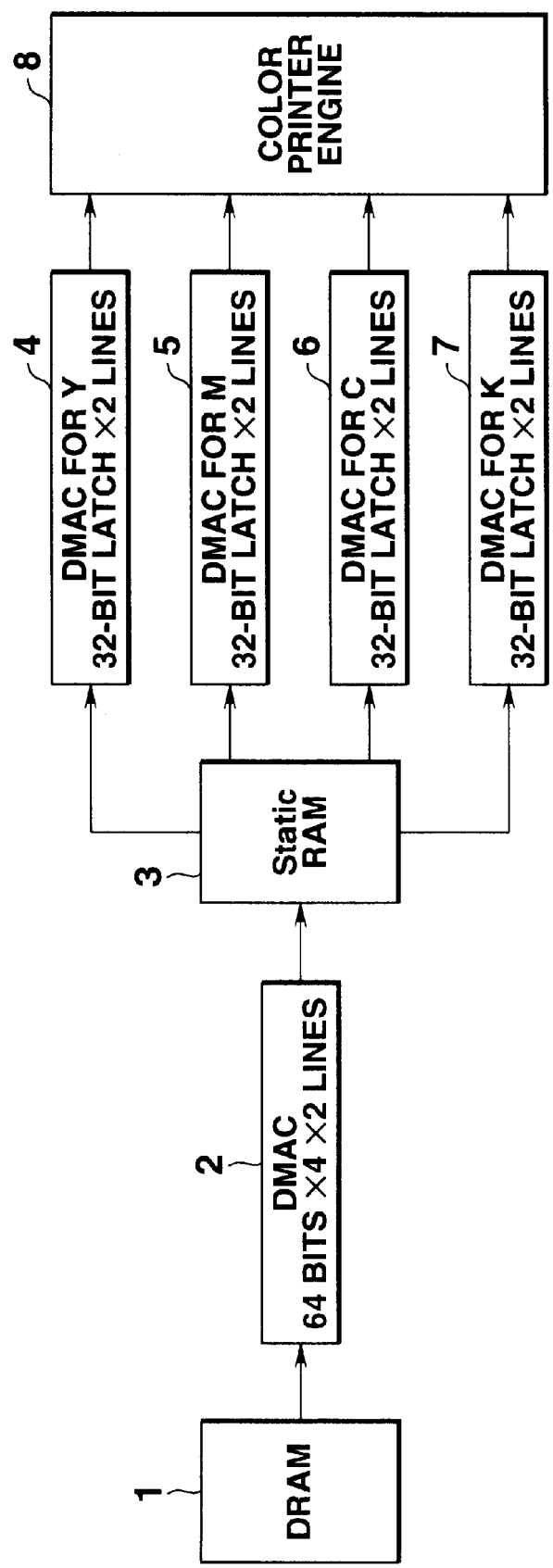
FIG. 1 is a block diagram illustrating the schematic structure of a video data transfer section of a tandem type color printer according to one embodiment of this invention.

A video data transfer apparatus according to one embodiment of the present invention will now be described with reference to the accompanying drawings. In FIG. 1, video data of yellow (Y), magenta (M), cyan (C) and black (K) are stored in a DRAM 1. The video data of those four colors are transferred to an SRAM 3 band by band via a DMAC 2.

The video data of yellow stored in the SRAM 3 is transferred to a color printer engine 8 by a DMAC 4 for yellow (hereinafter called Y-DMAC 4). The video data of magenta stored in the SRAM 3 is transferred to the color printer engine 8 by a DMAC 5 for magenta (hereinafter called M-DMAC 5). The video data of cyan stored in the SRAM 3 is transferred to the color printer engine 8 by a DMAC 6 for cyan (hereinafter called C-DMAC 6). The video data of black stored in the SRAM 3 is transferred to the color printer engine 8 by a DMAC 7 for black (hereinafter called K-DMAC 7).

Figure 13:
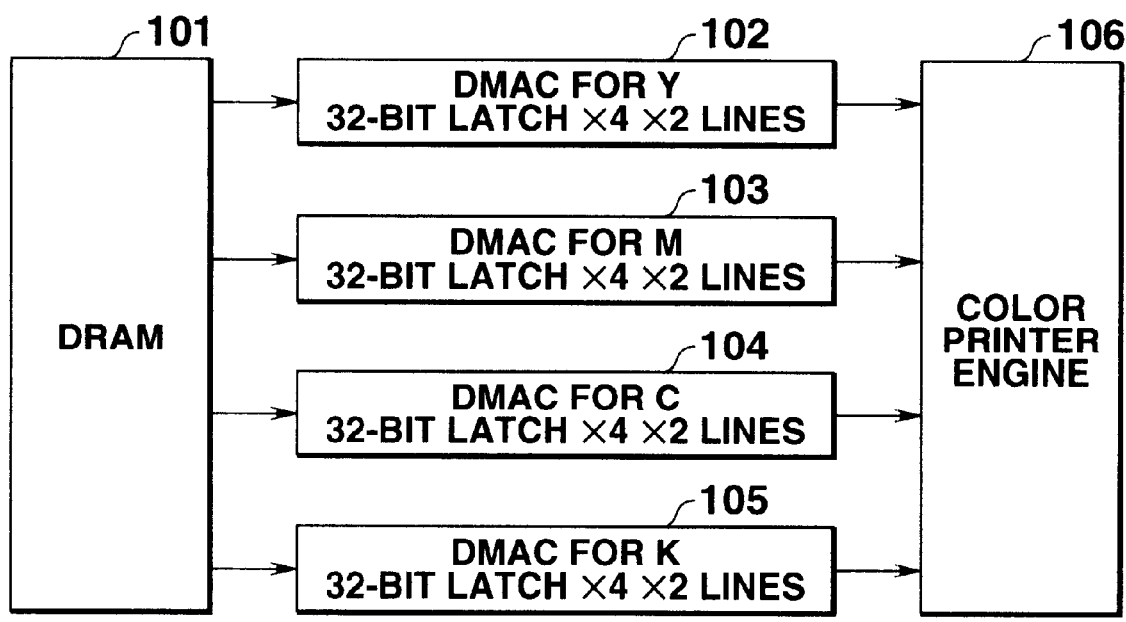
FIG. 13 is a block diagram showing the schematic structure of a video transfer section of the conventional tandem type color printer.

To operate a high-resolution printer having a resolution of, for example,600 dpi in a burst mode and to ensure fast data transfer, the required capacity of the DMAC 2 is 64 bits×4 (quantity)×2 (lines) The needed capacity of each of the Y-DMAC 4, M-DMAC 5, C-DMAC 6 and K-DMAC 7 is 32-bit latch ×two lines. The total capacity of the entire DMACs is therefore 512 bits+64 bits×4 (quantity×2 (lines)= 768 bits. With regard to the DMAC, therefore, the capacity is reduced as compared with that of the conventional printer shown in FIG. 13. If the DMAC is constructed by an ASIC, the circuit scale of the ASIC becomes smaller.

Figure 2:
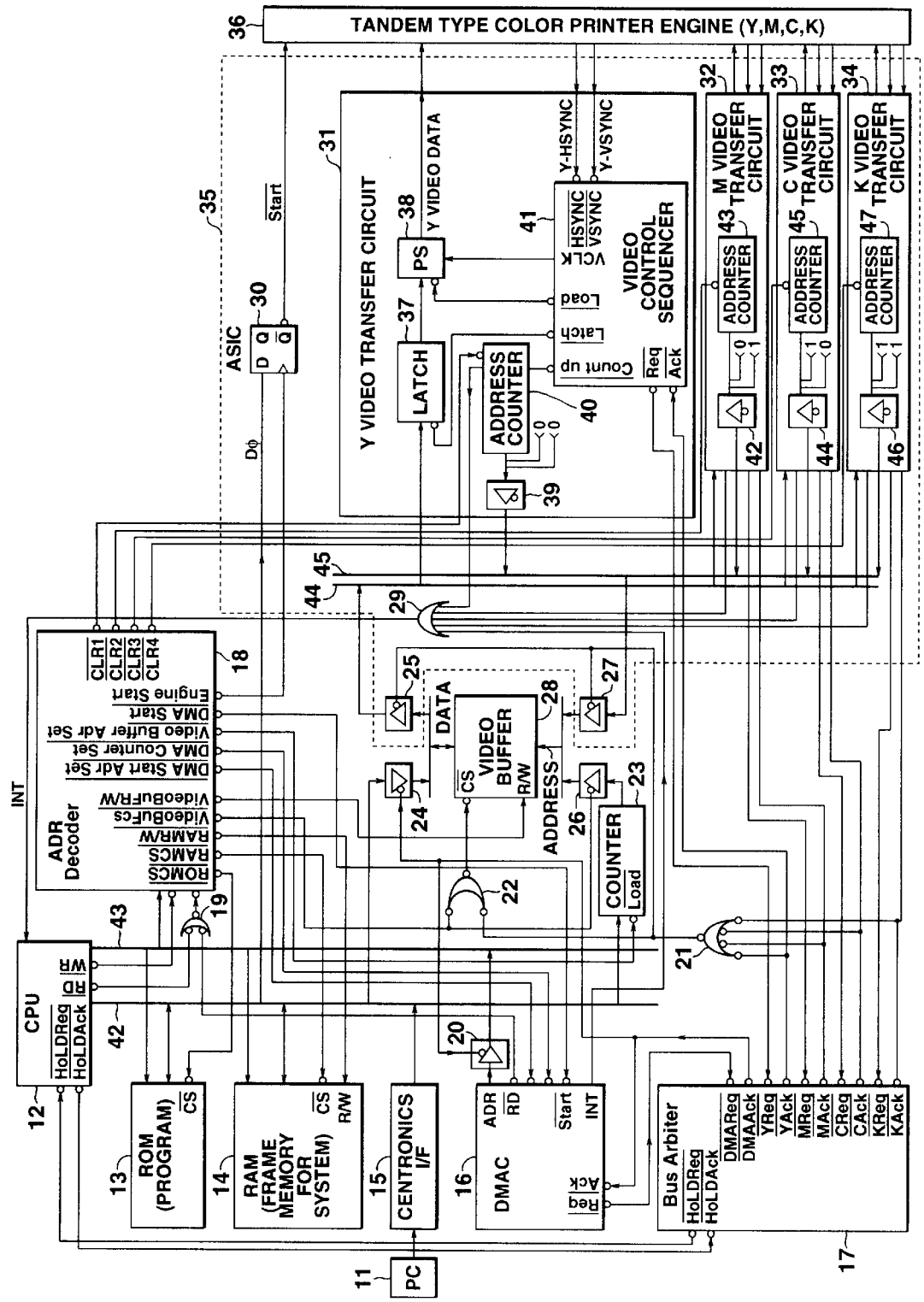
FIG. 2 is a block diagram showing the schematic structure of a video data transfer apparatus according to one embodiment of this invention.

FIG. 2 is a block diagram showing the schematic structure of the video data transfer apparatus according to this embodiment. In FIG. 2, connected to a data bus 42 are a CPU 12, a ROM 13, a RAM 14, a centronics interface 15, the input terminal of a counter 23, and the input terminal of a write buffer 24. Connected to an address bus 43 are the CPU 12, the ROM 13, the RAM 14, an address decoder 18 and the output terminal of a buffer 20. Connected to a data bus 44 are the output terminal of a read buffer 25, the input terminal of a latch circuit 37, an M video transfer circuit 32, a C video transfer circuit 33, and a K video transfer circuit 34. Connected to an address bus 45 are the input terminal of a read buffer 27, and the output terminals of buffers 39, 42, 44 and 46. The data buses 42 and 44 transfer 8-bit data D0–D7 in parallel.

A personal computer 11 is connected to the centronics interface 15. The RD terminal of the CPU 12 is connected to the input terminal of a NOR gate 19. The WR terminal of the CPU 12 is connected to the address decoder 18. The Adr terminal of a DMAC 16 is connected to the input terminal of the buffer 20. The RD terminal of the DMAC 16 is connected to the input terminal of the NOR gate 19. The iNT terminal of the DMAC 16 is connected to the input terminal of an OR gate 29. The output terminal of the NOR gate 19 is connected to the address decoder 18. The output terminal of a NOR gate 21 is connected to the input terminal of a NOR gate 22 whose output terminal is connected to the CS terminal of a video buffer 28. The output terminal of the counter 23 is connected to the input terminal of a write buffer 26.

The output terminal of the write buffer 24 and the input terminal of the read buffer 25 are connected to the video buffer 28 via a data bus. The output terminal of the write buffer 26 and the input terminal of the read buffer 27 are connected to the video buffer 28 via an address bus. The address counter 40, M video transfer circuit 32, C video transfer circuit 33 and K video transfer circuit 34 are connected to the input terminal of the OR gate 29. The output terminal of the OR gate 29 is connected to the CPU 12. The D terminal of a flip-flop 30 is connected to a DO signal line of the data bus 42. The inverting output terminal of the flip-flop 30 is connected to a tandem type color printer engine 36.

The HoldReq terminal of a bus arbiter 17 is connected to the HoldReq terminal of the CPU 12. The HoldAck terminal of the bus arbiter 17 is connected to the HoldAck terminal of the CPU 12. The DMAReq terminal of the bus arbiter 17 is connected to the Req terminal of the DMAC 16. The DMAAck terminal of the bus arbiter 17 is connected to the Ack terminal of the DMAC 16, the buffer 20 and the write buffer 24. The YReq terminal of the bus arbiter 17 is connected to the Req terminal of a video control sequencer 41. The YAck terminal of the bus arbiter 17 is connected to the Ack terminal of the video control sequencer 41 and the input terminal of the NOR gate 21. The MReq terminal of the bus arbiter 17 is connected to the M video transfer circuit 32. The MAck terminal of the bus arbiter 17 is connected to the M video transfer circuit 32 and the input terminal of the NOR gate 21. The CReq terminal of the bus arbiter 17 is connected to the C video transfer circuit 33. The CAck terminal of the bus arbiter 17 is connected to the C video transfer circuit 33 and the input terminal of the NOR gate 21. The KReq terminal of the bus arbiter 17 is connected to the K video transfer circuit 34. The KAck terminal of the bus arbiter 17 is connected to the K video transfer circuit 34 and the input terminal of the NOR gate 21.

The ROMCS terminal of the address decoder 18 is connected to the CS terminal of the ROM 13. The RAMCS terminal of the address decoder 18 is connected to the CS terminal of the RAM 14. The RAM R/W terminal of the address decoder 18 is connected to the R/W terminal of the RAM 14. The VideoBufCS terminal of the address decoder 18 is connected to the input terminal of the NOR gate22 and the buffer 26. The VideoBuf R/W terminal of the address decoder 18 is connected to the R/W terminal of the video buffer 28. The DMAStartAdrSet terminal and DMA-CounterSet terminal of the address decoder 18 are connected to the DMAC 16. The DMAStart terminal of the address decoder 18 is connected to the Start terminal of the DMAC 16. The EngineStart terminal of the address decoder 18 is connected to the flip-flop 30. The CLR1 terminal of the address decoder 18 is connected to the clear terminal of the address counter 40. The CLR2 terminal of the address decoder 18 is connected to an address counter 43 of the M video transfer circuit 32. The CLR3 terminal of the address decoder 18 is connected to an address counter 45 of the C video transfer circuit 33. The CLR4 terminal of the address decoder 18 is connected to an address counter 47 of the K video transfer circuit 34.

The CountUp terminal of the video control sequencer 41 is connected to the address counter 40. The Latch terminal of the video control sequencer 41 is connected to the latch circuit 37. The LOAD terminal and VCLK terminal of the video control sequencer 41 are connected to a parallel-serial converter 38. The HSYNC terminal and VSYNC terminal of the video control sequencer 41 are connected to the tandem type color printer engine 36. The output terminal of the latch circuit 37 is connected to the input terminal of the parallel-serial converter 38. The output terminal of the parallel-serial converter 38 is connected to the tandem type color printer engine 36. The M video transfer circuit 32, C video transfer circuit 33 and K video transfer circuit 34 are connected to the tandem type color printer engine 36.

"00" is input to the input terminals for the uppermost two bits of the buffer 39, and the output terminal of the address counter 40 is connected to the input terminals for the lower bits of the buffer 39. "01" is input to the input terminals for the uppermost two bits of the buffer 42, and the output terminal of the address counter 43 is connected to the input terminals for the lower bits of the buffer 42. "10" is input to the input terminals for the uppermost two bits of the buffer 144, and the output terminal of the address counter 45 is connected to the input terminals for the lower bits of the buffer 44. "11" is input to the input terminals for the uppermost two bits of the buffer 46, and the output terminal of the address counter 47 is connected to the input terminals for the lower bits of the buffer 46.

The read buffers 25 and 27, the OR gate 29, the flip-flop 30, the Y video transfer circuit 31, the M video transfer circuit 32, the C video transfer circuit 33 and the K video transfer circuit 34 are constituted by an ASIC 35. The structures of the M video transfer circuit 32, C video transfer circuit 33 and K video transfer circuit 34 are identical to the structure of the Y video transfer circuit 31.

The operation of the video data transfer apparatus in FIG. 2 will now be described.

When the personal computer 11 sends print data via the interface 15, the CPU 12 analyzes the sent print data and generates video data (dot pattern data) of yellow, magenta, cyan and black, and stores the video data in the RAM 14.

Next, the DMAC 16 reads video data from the RAM 14, band by band (e.g., a unit of 4096 bytes), and writes video data of the individual colors (yellow, magenta, cyan and black) in the video buffer 28, color by color. The video data written in the video buffer 28 are read and transferred to the tandem type color printer engine 36 by the Y video transfer circuit 31, M video transfer circuit 32, C video transfer circuit 33 and K video transfer circuit 34.

For example, the Y video transfer circuit 31 is provided with the latch circuit 37 and the parallel-serial converter 38, so that video data read from the video buffer 28 is latched by the latch circuit 37 and is then supplied to the parallel-serial converter 38. While video data is being transferred to the tandem type color printer engine 36, next video data can be read from the video buffer 28. This can assure fast access to the video buffer 28.

The DMAC 16, Y video transfer circuit 31, M video transfer circuit 32, C video transfer circuit 33 and K video transfer circuit 34 individually access the video buffer 28. It is therefore necessary to avoid access collision. To avoid access collision, the bus arbiter 17 adjusts accesses to the video buffer 28 by the DMAC 16, the Y video transfer circuit 31, M video transfer circuit 32, C video transfer circuit 33 and K video transfer circuit 34. When gaining access to the RAM 14, the DMAC 16 makes a hold request to the CPU 12. This prevents collision of accesses to the RAM 14 by the CPU 12 and the DMAC 16.

When one band of video data in the video buffer 28 is transferred to the tandem type color printer engine 36, next one band of video data stored in the RAM 14 should be written in the video buffer 28. When transfer of one band of video data in the video buffer 28 is completed, the Y video transfer circuit 31, M video transfer circuit 32, C video transfer circuit 33 or K video transfer circuit 34 outputs an iNT signal. Based on this iNT signal, the DMAC 16 determines the timing for writing next one band of video data in the video buffer 28. Accordingly, this video data transfer apparatus can sequentially carry out reading of video data from the video buffer 28.

As apparent from the above, the Y video transfer circuit 31, M video transfer circuit 32, C video transfer circuit 33 and K video transfer circuit 34 transfer video data while sharing the same single video buffer 28. This feature suppresses an increase in the scale of the circuit which transfers video data stored in the RAM (frame memory) 14 to the tandem type color printer engine 36.

In writing video data, stored in the RAM 14, in the video buffer 28, the DMAC 16 sends an address to the RAM 14 and reads video data from the RAM 14, while the counter 28 sends an address to the video buffer 28 and writes the video data, read from the RAM 14, in the video buffer 28. This can allow the DMAC 16 to continuously supply addresses to the RAM 14 in order to read video data from the RAM 14. Thus, the time to transfer video data to the video buffer 28 from the RAM 14 is shortened.

If a fast-readable SRAM is used for the video buffer 28, the time to transfer video data to the video transfer circuits 31–34 from the video buffer 28 is shortened. This can ensure fast transfer of video data, stored in the RAM (frame memory) 14 to the tandem type color printer engine 36. Even when the video DMACs operate slowly, the occurrence of an overrun can be prevented if the sum of the operation times lies within the processing time of the video buffer 28.

Figure 3:
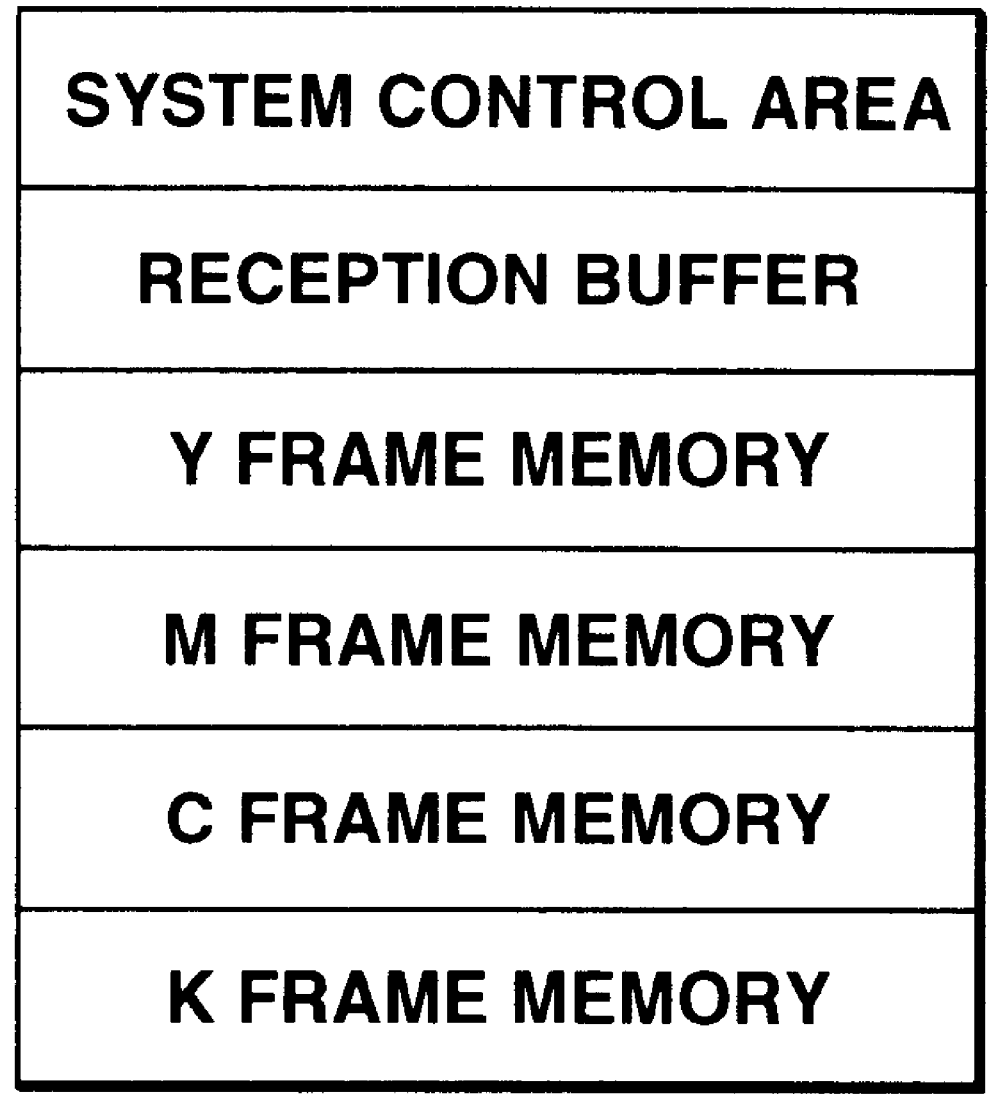
FIG. 3 is a diagram exemplifying the contents of a RAM in FIG. 2.

FIG. 3 is a diagram exemplifying the contents of the memory area of the RAM 14. As shown in FIG. 3, the RAM 14 is provided with a system control area, a reception buffer, a Y frame memory, an M frame memory, a C frame memory and a K frame memory. The Y frame memory stores one frame of yellow video data. The M frame memory stores one frame of magenta video data. The C frame memory stores one frame of cyan video data. The K frame memory stores one frame of black video data.

Figure 4:
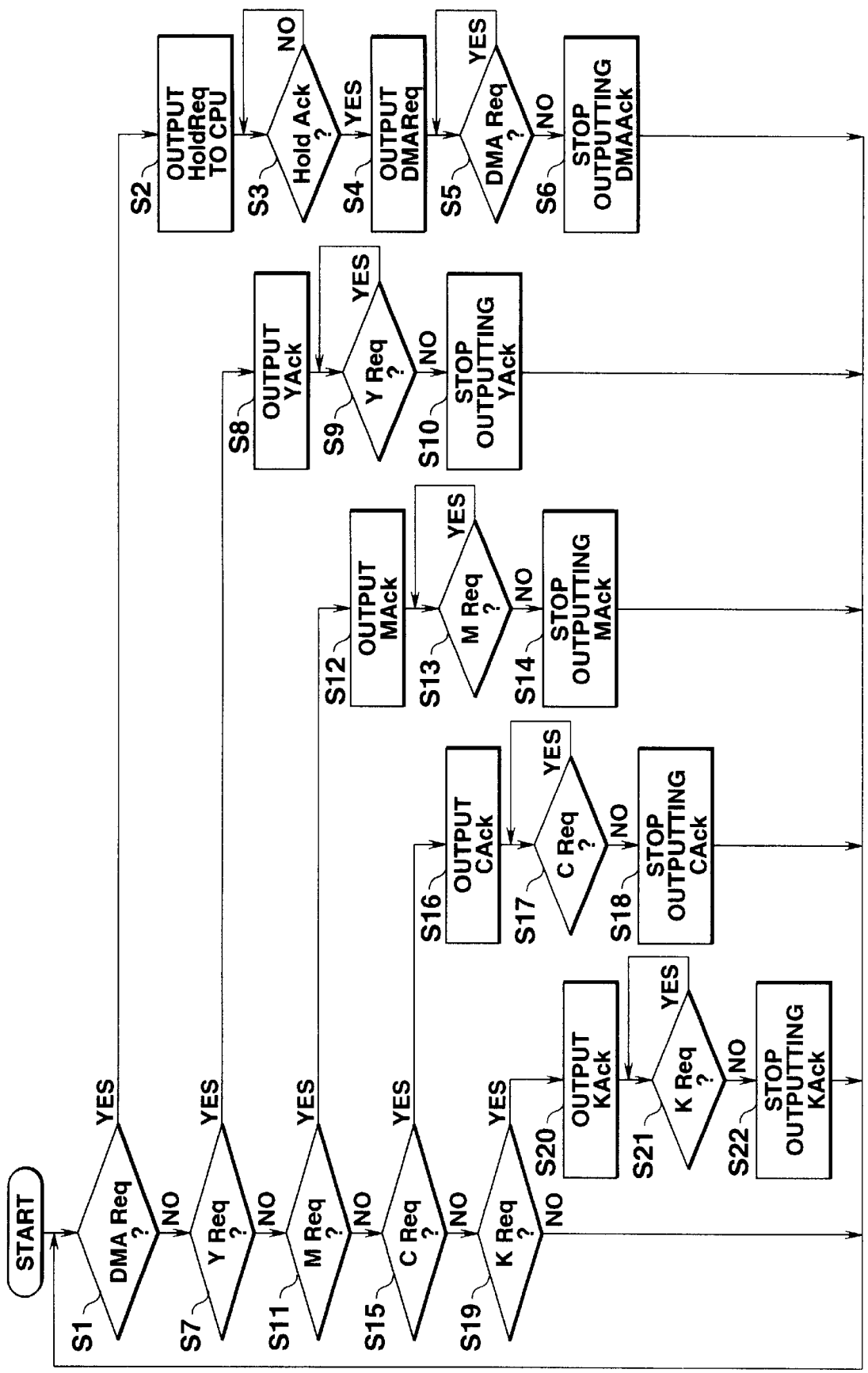
FIG. 4 is a flowchart illustrating one example of the operation of a bus arbiter in FIG. 2.

FIG. 4 is a flowchart illustrating one example of the operation of the bus arbiter 17 in FIG. 2.

In FIG. 4, the bus arbiter 17 determines if a DMAReq signal is output from the DMAC 16 (step S1). When the DMAReq signal is output from the DMAC 16, the bus arbiter 17 sends a HoldReq signal to the CPU 12 (step S2). When sending the HoldReq signal to the CPU 12, the bus arbiter 17 waits for a HoldAck signal from the CPU 12 (step S3). When the HoldAck signal is sent from the CPU 12, the bus arbiter 17 sends a DMAAck signal to the DMAC 16 (step S4). The bus arbiter 17 stands by in this state until the DMAReq signal is stopped (step S5). When the DMAReq signal is stopped, the bus arbiter 17 stops outputting the DMAReq signal (step S6) and then returns to step S1.

When the bus arbiter 17 has determined in step S1 that the DMAReq signal is not output, the bus arbiter 17 determines if a YReq signal is output from the Y video transfer circuit 31 (step S7). When the YReq signal is output from the Y video transfer circuit 31, the bus arbiter 17 sends a YAck signal to the Y video transfer circuit 31 (step S8). The bus arbiter 17 stands by in this state until the YReq signal is stopped (step S9). Upon stopping of the YReq signal, the bus arbiter 17 stops outputting the YAck signal (step S10) and then returns to step S1.

When the bus arbiter 17 has determined in step S1 that the DMAReq signal is not output and has further determined in step S7 that the YReq signal is not output, the bus arbiter 17 determines if an MReq signal is output from the M video transfer circuit 32 (step S11). When the MReq signal is output from the M video transfer circuit 32, the bus arbiter 17 sends an MAck signal to the M video transfer circuit 32 (step S12). The bus arbiter 17 stands by in this state until the MReq signal is stopped (step S13). Upon stopping of the MReq signal, the bus arbiter 17 stops outputting the MAck signal (step S14) and then returns to step S1.

When the bus arbiter 17 has determined in step S1 that the DMAReq signal is not output, has determined in step S7 that the YReq signal is not output and has further determined in step S11 that the MReq signal is not output, the bus arbiter 17 determines if a CReq signal is output from the C video transfer circuit 33 (step S15). When the CReq signal is output from the C video transfer circuit 33, the bus arbiter 17 sends a CAck signal to the C video transfer circuit 33 (step S16) The bus arbiter 17 stands by in this state until the CReq signal is stopped (step S17). Upon stopping of the CReq signal, the bus arbiter 17 stops outputting the CAck signal (step S18) and then returns to step S1.

When the bus arbiter 17 has determined in step S1 that the DMAReq signal is not output, has determined in step S7 that the YReq signal is not output, has determined in step S11 that the MReq signal is not output and has further determined in step S15 that the CReq signal is not output, the bus arbiter 17 determines if a KReq signal is output from the K video transfer circuit 34 (step S19). When the KReq signal is output from the K video transfer circuit 34, the bus arbiter 17 sends a KAck signal to the K video transfer circuit 34 (step S20). The bus arbiter 17 stands by in this state until the KReq signal is stopped (step S21). Upon stopping of the KReq signal, the bus arbiter 17 stops outputting the KAck signal (step S22) and then returns to step S1.

The bus arbiter 17 manages accesses to the video buffer 28 from the DMAC 16 in steps S2–S6 in the above manner. The bus arbiter 17 also manages accessing to the video buffer 28 from the Y video transfer circuit 31 in steps S8–S10. The bus arbiter 17 likewise manages accessing to the video buffer 28 from the M video transfer circuit 32 in steps S12–S14. The bus arbiter 17 further manages accessing to the video buffer 28 from the C video transfer circuit 33 in steps S16–S18. The bus arbiter 17 also manages accessing to the video buffer 28 from the K video transfer circuit 34 in steps S20–S22. When the Y video transfer circuit 31, the M video transfer circuit 32, the C video transfer circuit 33 or the K video transfer circuit 34 completes transfer of one band of video data from the video buffer 28, the bus arbiter 17 returns to step S1 and writes next one band of video data in the video buffer 28. Through the above-described process, one frame of video data stored in the RAM 14 is sequentially transferred to the tandem type color printer engine 36.

Figure 5:
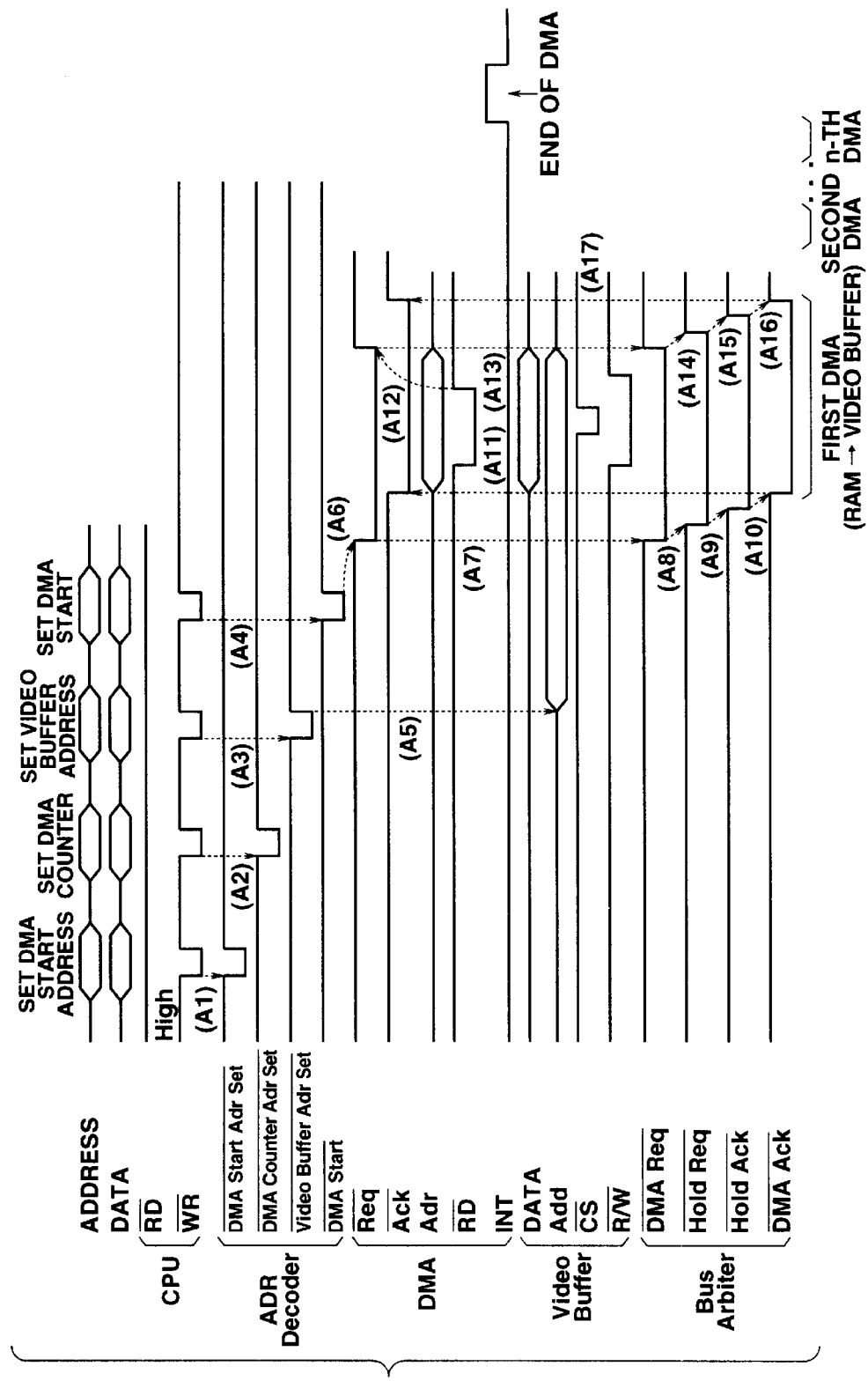
FIG. 5 is a time chart exemplifying the operation of the video data transfer apparatus when writing video data in a video buffer.

FIG. 5 is a time chart exemplifying the operation of the video data transfer apparatus when writing video data in the video buffer 28 in FIG. 2.

In writing video data stored in the RAM 14 into the video buffer 28, as shown in FIG. 5, the CPU 12 sets an RD signal to a high level and sends a WR signal to the address decoder 18 (A1, A2, A3, A4). As a result, setting the DMA start address, setting the DMA counter, setting the video buffer address and setting for the DMA start are carried out. In accordance with the WR signal output from the CPU 12, the address decoder 18 sends a DMA start address set signal and a DMA counter set signal to the DMAC 16, sends a video buffer address set signal to the counter 23, and sends a DMA start set signal to the DMAC 16 (A6).

Upon reception of the video buffer address set signal from the address decoder 18, the counter 23 sets an address in the video buffer 28 and sends it to the buffer 26 (A5). The buffer 26 sends out the address in the video buffer 28 to the address bus of the video buffer 28.

Upon reception of the DMA start address set signal from the address decoder 18, the DMAC 16 sets a start address in the RAM 14 into the buffer 20. When receiving the DMA start set signal from the address decoder 18, the DMAC 16 sets the DMAReq signal to a low level from a high level, thus making a write request to the bus arbiter 17 (A7). When the write request is made by the DMAc 16, the bus arbiter 17 checks if the Y video transfer circuit 31, the M video transfer circuit 32, the C video transfer circuit 33 or the K video transfer circuit 34 has made an access request. When none of the Y video transfer circuit 31, M video transfer circuit 32, C video transfer circuit 33 and K video transfer circuit 34 have made an access request, the bus arbiter 17 sets the HoldReq signal to a low level from a high level, thus making a hold request to the CPU 12 (A8).

When the bus arbiter 17 makes the hold request, the CPU 12 frees the data bus 42 and the address bus 43. Then, the CPU 12 sets the HoldAck signal to a low level from a high level, granting a hold permission to the bus arbiter 17 (A9). When the CPU 12 grants the hold permission, the bus arbiter 17 sets the DMAAck signal to a low level from a high level (A10), thereby granting a write permission to the DMAC 16 (A11).

When the bus arbiter 17 gives the write permission, the DMAC 16 sends the RD signal to the address decoder 18 via the NOR gate 19. Upon reception of the RD signal from the DMAC 16, the address decoder 18 sends a RAM read signal to the R/W terminal of the RAM 14, and a RAM chip select signal to the CS terminal of the RAM 14. Further, the address decoder 18 sends a video buffer read signal to the R/W terminal of the video buffer 28, and sends a video buffer chip select signal to the CS terminal of the video buffer 28 via the NOR gate 22.

When receiving the RAM read signal and RAM chip select signal from the DMAC 16, the RAM 14 reads video data at the location indicated by the address sent via the address bus 43 from the buffer 20, and sends the read video data onto the data bus 42. The video data output on the data bus 42 is stored in the write buffer 24. The write buffer 24 sends out the video data, retained in itself, to the data bus of the video buffer 28.

When receiving the video buffer read signal and the video buffer chip select signal from the DMAC 16, the video buffer 28 writes data, output from the write buffer 24, at the location indicated by the address that has been output from the buffer 26. When first writing into the video buffer 28 is completed, the DMAC 16 sets the RD signal to the high level from the low level (A12), and also sets the DMAReq signal to the high level from the low level, thereby informing the bus arbiter 17 of the end of the write request (A13). When being informed of the end of the write request by the DMAC 16, the bus arbiter 17 sets the HoldReq signal to the high level from the low level (A14).

When the bus arbiter 17 releases the hold request, the CPU 12 occupies the data bus 42 and the address bus 43. Then, the CPU 12 releases the hold permission to the bus arbiter 17 by setting the HoldAck signal to the high level from the low level (A15). When the CPU 12 releases the hold permission, the bus arbiter 17 sets the DMAAck signal to the high level from the low level (A16), thereby releasing the write permission to the DMAC 16 (A17).

When first writing into the video buffer 28 is completed, the counter 23 increments the address of the video buffer 28, and sends out the incremented result to the buffer 26. The buffer 26 sends out the incremented address of the video buffer 28 to the address bus of the video buffer 28.

When first writing into the video buffer 28 is completed, the DMAC 16 increments the start address of the RAM 14, and sets the incremented address in the buffer 20. Then, the DMAC 16 makes a write request to the bus arbiter 17, and outputs the RD signal when the bus arbiter 17 gives a write permission. Consequently, video data at the location indicated by the incremented address in the RAM 14 is read out. This video data is sent to the video buffer 28 and written at the location indicated by the address output from the counter 23.

When the above-described operation is repeated and the number of times the address to be output from the DMAC 16 has been incremented reaches the DMA counter set value, the DMAC 16 sends the iNT signal to the CPU 12 via the OR gate 29, instructing the end of DMA. Upon reception of the iNT signal from the DMAC 16, the CPU 12 sets the DMA start address, the DMA counter and the video buffer address and implements the setting for the DMA start, thus instructing the DMAC 16 to write next one band of video data in the video buffer 28.

Figure 6:
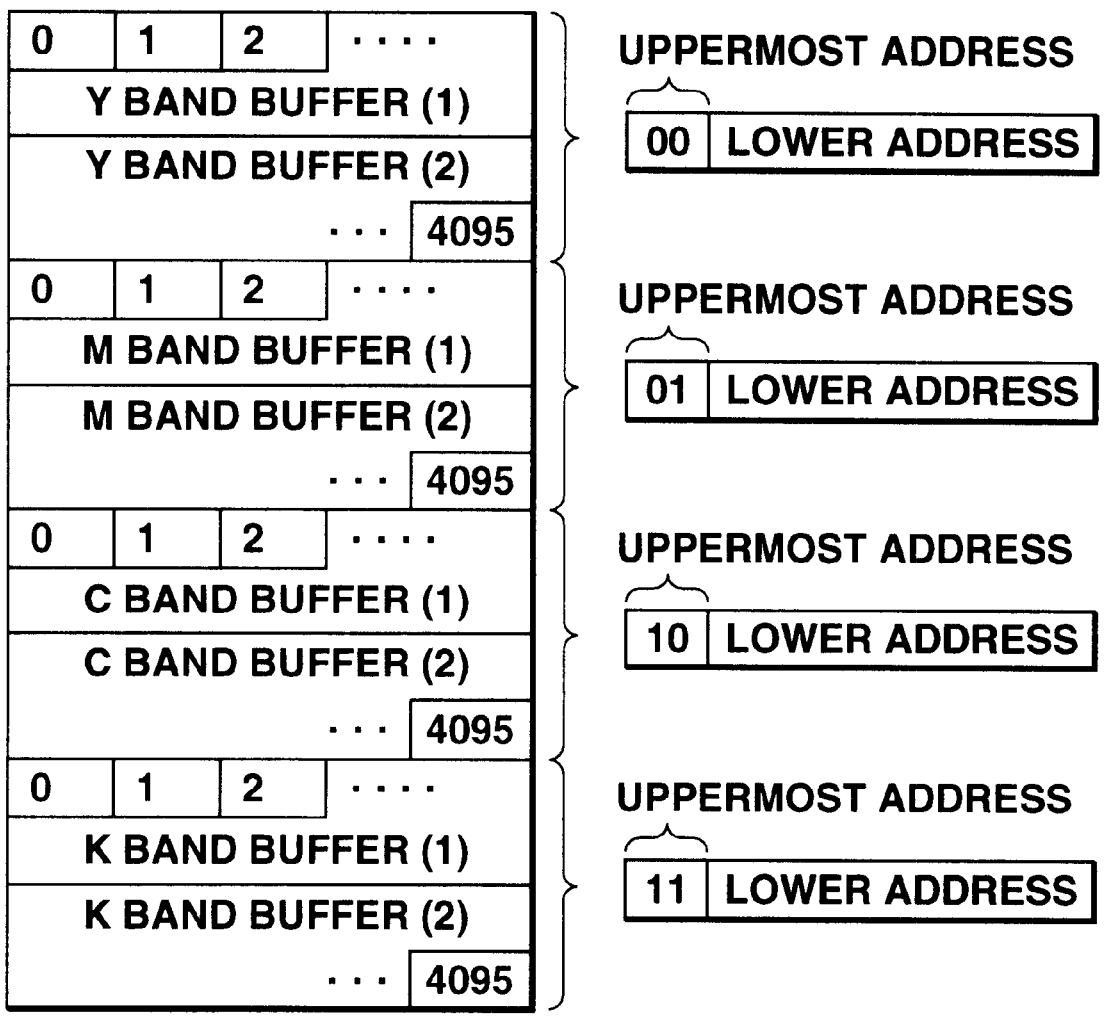
FIG. 6 is a diagram exemplifying the contents of the video buffer in FIG. 2.

FIG. 6 is a diagram exemplifying the contents of the memory area of the video buffer 28 in FIG. 2. As shown in FIG. 6, the video buffer 28 is provided with a Y band buffer, an M band buffer, a C band buffer and a K band buffer, each having the size of 4096 bytes. Each of the Y band buffer, M band buffer, C band buffer and K band buffer is separated into two regions: band buffer (1) and band buffer (2). When writing into one of those two regions is being carried out, reading from the other region is performed. This permits simultaneous writing and reading in each band.

Figure 7:
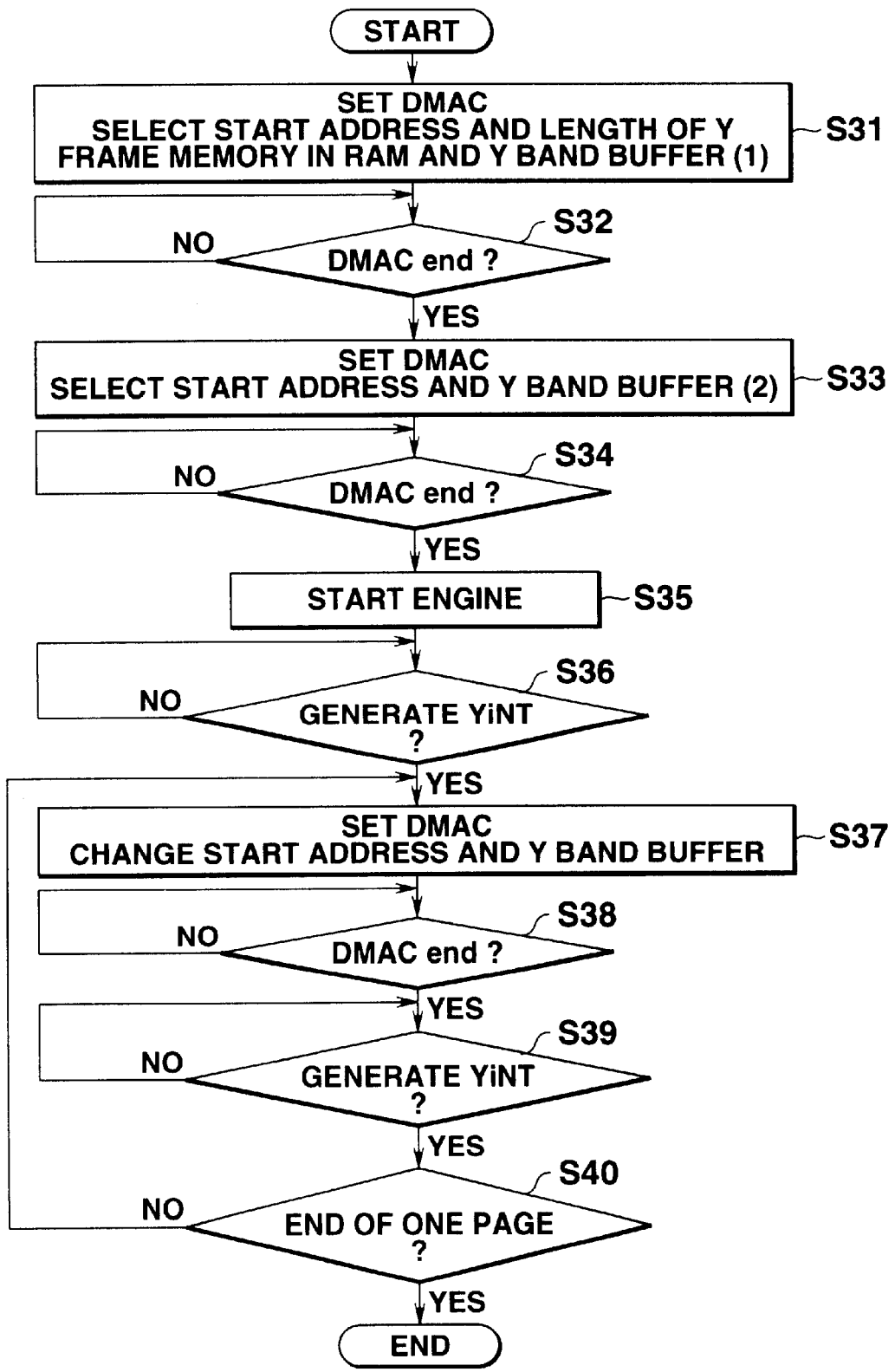
FIG. 7 is a flowchart illustrating one example of the operation of a CPU at the time of writing data in a Y band buffer in FIG. 6.

FIG. 7 is a flowchart illustrating one example of the operation of the CPU 12 at the time of writing video data in the Y band buffer in FIG. 6. As illustrated in FIG. 7, the CPU 12 transfers the top one band of video data in the RAM 14 to the Y band buffer (1) first. To implement the data transfer, the CPU 12 sets the start address and length (set value of the DMA counter) of the Y frame memory of the RAM 14 to the DMAC 16, and sets the start address of the video buffer 28 at the first address in the Y band buffer (1) (step S31). The CPU 12 then determines whether or not transfer of the first one band of video data in the RAM 14 to the Y band buffer (1) has been completed by detecting if the iNT signal has been sent from the DMAC 16 (step S32).

When the iNT signal is sent from the DMAC 16, the CPU 12 transfers next one band of video data in the RAM 14 to the Y band buffer (2). To implement the data transfer, the CPU 12 sets the next start address of the Y frame memory of the RAM 14 to the DMAC 16, and sets the start address of the video buffer 28 at the first address in the Y band buffer (2) (step S33) The CPU 12 then determines whether or not transfer of the next one band of video data in the RAM 14 to the Y band buffer (2) has been completed by detecting if the iNT signal has been sent from the DMAC 16 (step S34).

When the iNT signal is sent from the DMAC 16, the CPU 12 activates the tandem type color printer engine 36 (step S35) Then, the CPU 12 determines whether or not transfer of one band of video data to the tandem type color printer engine 36 from the Y band buffer has been completed by detecting if a YiNT signal has been sent from the Y video transfer circuit 31 (step S36).

When the YiNT signal is sent from the Y video transfer circuit 31, the CPU 12 transfers next one band of video data in the RAM 14 to that one of the Y band buffers where transfer of one band of video data has been completed. To carry out the data transfer, the CPU 12 sets the next start address of the Y frame memory of the RAM 14 to the DMAC 16, and changes the start address of the video buffer 28 in such a way as to indicate the Y band buffer (1) or the Y band buffer (2) where transfer of one band of video data has been completed (step S37). The CPU 12 then determines whether or not transfer of the next one band of video data in the RAM 14 to the Y band buffer has been completed by detecting if the iNT signal has been sent from the DMAC 16 (step S38).

When the iNT signal is sent from the DMAC 16, the CPU 12 determines whether or not transfer of one band of video data to the tandem type color printer engine 36 from the Y band buffer has been completed by detecting if the YiNT signal has been sent from the Y video transfer circuit 31 (step S39). When the YiNT signal is sent from the Y video transfer circuit 31, the CPU 12 determines if transfer of one page of video data to the Y band buffer has been completed (step S40). When transfer of one page has not been completed yet, the CPU 12 returns to step S37 and instructs the DMAC 16 to transfer next one band of video data in the RAM 14 to the Y band buffer.

The operations of the CPU 12 for writing video data in the M band buffer, C band buffer and K band buffer in FIG. 6 are the same as the operation illustrated in FIG. 7.

Figure 8:
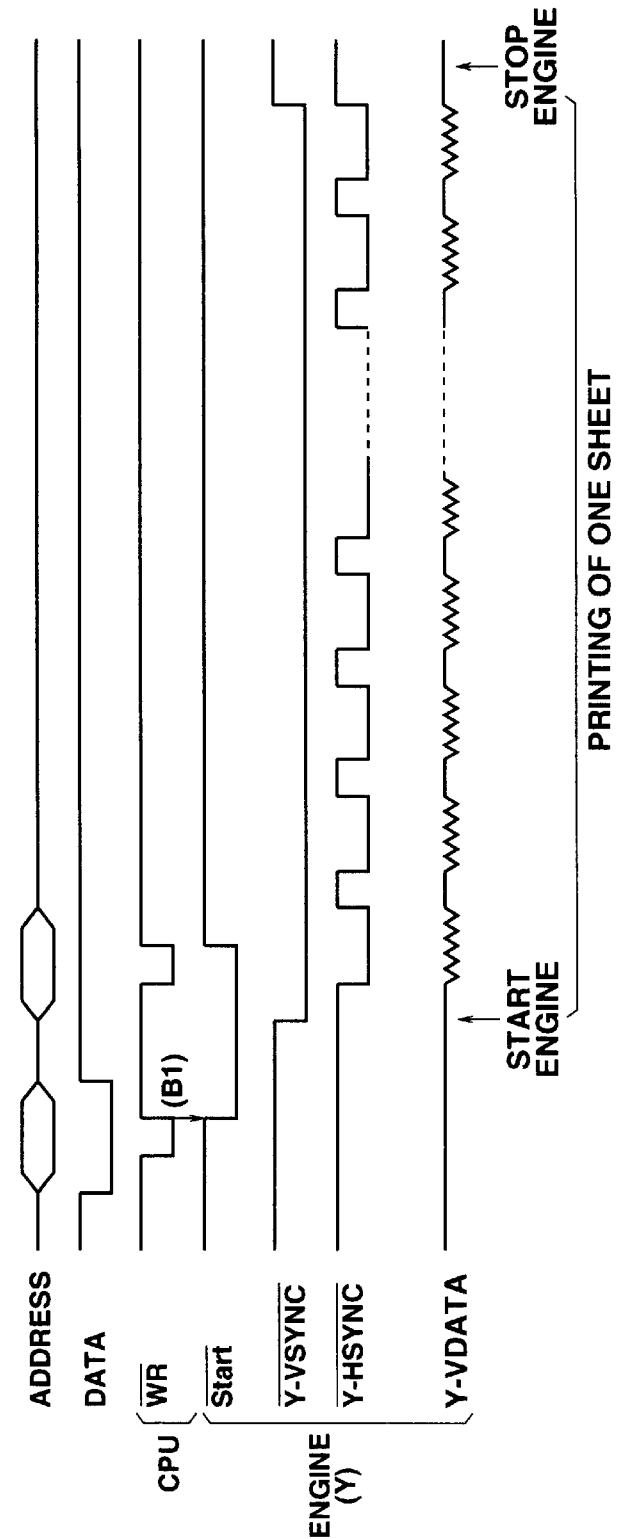
FIG. 8 is a time chart exemplifying the operation of the tandem type color printer when printing on a sheet of paper.

FIG. 8 is a time chart exemplifying the operation of the tandem type color printer engine 36 when printing a sheet of paper in yellow. When the CPU 12 sends the WR signal to the address decoder 18 (B1), as shown in FIG. 8, the address decoder 18 sends an engine start signal to the flip-flop 30. When "0" is input to the D terminal of the flip-flop 30 from the D0 signal line of the data bus 42, the Start signal is sent to the tandem type color printer engine 36 from the flip-flop 30. When receiving the Start signal from the flip-flop 30, the tandem type color printer engine 36 sends a Y-VSYNC signal and Y-HSYNC signal to the Y video transfer circuit 31. The Y video transfer circuit 31 supplies Y video data to the tandem type color printer engine 36 in synchronism with the Y-HSYNC signal. Consequently, one sheet of paper is printed in yellow.

The operation of the color printer engine 36 for printing a sheet of paper in magenta, cyan or black is the same as the one illustrated in FIG. 8, and the Y video transfer circuit 31, M video transfer circuit 32, C video transfer circuit 33 and K video transfer circuit 34 operate independently.

Figure 9:
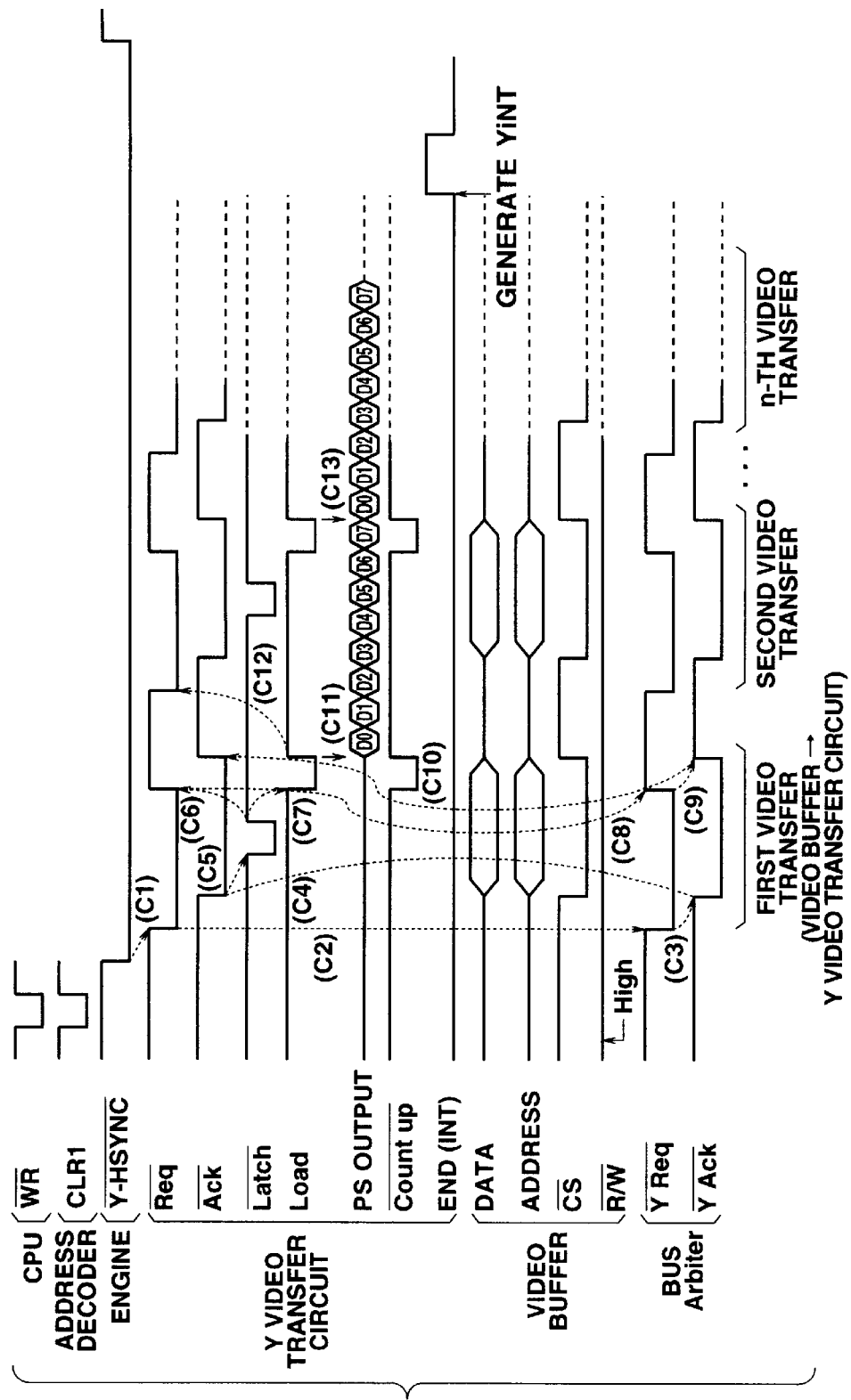
FIG. 9 is a flowchart illustrating one example of the operation of the video data transfer apparatus when reading data from the Y band buffer in FIG. 6.

FIG. 9 is a flowchart illustrating one example of the operation of the video data transfer apparatus when reading video data from the Y band buffer in FIG. 6. When the CPU 12 sends the WR signal to the address decoder 18 as shown in FIG. 9, the address decoder 18 sends a clear signal to the address counter 40 to clear the counter 40. The contents set in the address counter 40 are sent to the buffer 39. As a result, the uppermost two bits of the buffer 39 are set to "00" and the lower bits of the buffer 39 are set to a value output from the address counter 40. As the uppermost two bits of the buffer 39 indicate the uppermost address "00" in the Y band buffer in FIG. 5, the address for video data in the Y band buffer is designated by the value output from the buffer

39. That is, the lower bits of the buffer 39 indicate the lower address of the Y band buffer.

In the M video transfer circuit 32, the uppermost two bits of the buffer 42 are set to "01" which indicate the uppermost address "01" of the M band buffer. The output value of the buffer 42 therefore designates the address for video data in the M band buffer. In the C video transfer circuit 33, the uppermost two bits of the buffer 44 are set to "10" which indicate the uppermost address "10" of the C band buffer. The output value of the buffer 44 therefore designates the address for video data in the C band buffer. In the K video transfer circuit 34, the uppermost two bits of the buffer 46 are set to "11" which indicate the uppermost address "11" of the K band buffer. The output value of the buffer 46 therefore designates the address for video data in the M band buffer.

When the tandem type color printer engine 36 sends the Y-HSYNC signal to the video control sequencer 41 (C1), the video control sequencer 41 sets the Req signal to the low level from the high level, making a read request to the bus arbiter 17 (C2). When the video control sequencer 41 makes the read request, the bus arbiter 17 checks if an access request is output from the DMA 16, the M video transfer circuit 32, the C video transfer circuit 33 or the K video transfer circuit 34. If there is no access request from the DMA 16, the M video transfer circuit 32, the C video transfer circuit 33 or the K video transfer circuit 34, the bus arbiter 17 sets the YAck signal to the low level from the high level (C3), giving a read permission to the video control sequencer 41 (C4), and sends the YAck signal to the CS terminal of the video buffer 28 via the NOR gates 21 and 22, thus implementing chip selection of the video buffer 28. The YAck signal is also sent to the read buffers 25 and 27 via the NOR gate 21, so that the output value of the buffer 39 is put in the buffer 27. Video data at the location designated by the address that is output from the buffer 27 is read from the video buffer 28 and is put in the read buffer 25.

When the bus arbiter 17 grants the read permission, the video control sequencer 41 sends a Latch signal to the latch circuit 37 (C5). When the Latch signal is output from the video control sequencer 41, the latch circuit 37 latches the video data, stored in the read buffer 25, via the data bus 44, and sends the video data to the parallel-serial converter 38. When the latch circuit 37 latches the video data, the video control sequencer 41 sets the YReq signal to the high level from the low level (C6), informing the bus arbiter 17 of the end of the read request (C8), and sends a LOAD signal to the parallel-serial converter 38 (C7. Further, the video control sequencer 41 sends a count-up signal to the address counter 40 to increment the value of the counter 40 by "1." Consequently, the lower address for the video data in the Y band buffer is incremented by "1" ensuring reading of next video data from the Y band buffer.

When the level of the YAck signal becomes the high level from the low level (or the video control sequencer 41 informs the bus arbiter 17 of the end of the read request) (C8), the bus arbiter 17 sets the YAck signal to the high level from the low level (C9), releasing the read permission to the video control sequencer 41 (C10).

When the video control sequencer 41 outputs the LOAD signal, the parallel-serial converter 38 converts the 8-bit Y video data D0–D7, transferred in parallel from the latch circuit 37, to serial data. The parallel-serial converter 38 then transfers the Y video data D0–D7, bit by bit, to the tandem type color printer engine 36 in synchronism with a clock signal output from the video control sequencer 41 (C11). In this manner, the transfer of the first Y video data D0–D7 to the tandem type color printer engine 36 from the video buffer 28 is completed.

When the first Y video data D0–D7 are loaded into the parallel-serial converter 38 from the latch circuit 37, the video control sequencer 41 sets the YReq signal to the low level from the high level, and starts reading the second Y video data D0–D7 from the video buffer 28 (C12). The value of the address counter 40 has been incremented by "1" as a result of the count-up signal having been supplied to the address counter 40. Thus, the Y video data D0–D7 at the next address in the Y band buffer in FIG. 6 are read out from the video buffer 28. The Y video data D0–D7 read from the video buffer 28 are converted by the parallel-serial converter 38 to serial data, which is in turn transferred to the tandem type color printer engine 36 (C13). The transfer of the second Y video data D0–D7 to the tandem type color printer engine 36 from the video buffer 28 is completed in this manner.

In the above-described operation, the latch circuit 37 latches the Y video data D0–D7 read from the video buffer 28. While the parallel-serial converter 38 is transferring the first Y video data D0–D7 to the tandem type color printer engine 36, therefore, the second Y video data D0–D7 can be read from the video buffer 28.

When the above-described operation is repeated and the number of counts made by the address counter 40 reaches a predetermined value, the address counter 40 sends the iNT signal to the CPU 12 via the OR gate 29. Upon reception of the iNT signal from the Y video transfer circuit 32, the CPU 12 determines that transfer of one band of video data stored in the video buffer 28 has been completed. The CPU 12 then sends the WR signal to the address decoder 18 to instruct writing of next one band of video data, stored in the RAM 14, into the area in the video buffer 28 where transfer of one band of video data has been completed.

The operations of the M video transfer circuit 32, C video transfer circuit 33 and K video transfer circuit 34 for reading video data from the M band buffer, the C band buffer and the K band buffer respectively are the same as the one illustrated in FIG. 9.

Figure 10:
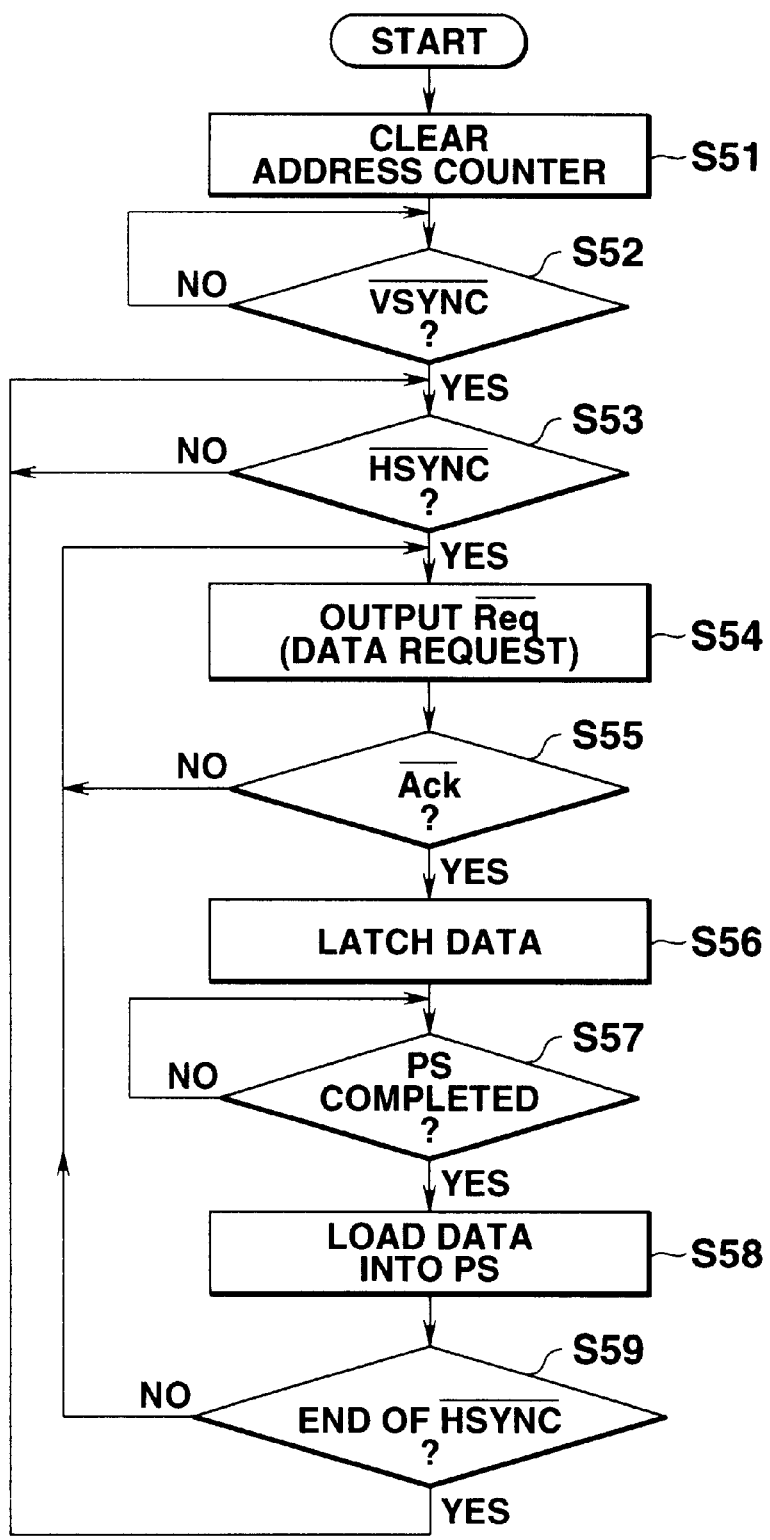
FIG. 10 is a flowchart illustrating one example of the operation of a video control sequencer in FIG. 2.

FIG. 10 is a flowchart illustrating one example of the operation of the video control sequencer 41 in FIG. 2.

As shown in FIG. 10, after the address decoder 18 clears the address counter 40 (step S51), the video control sequencer 41 determines if the VSYNC signal has been sent from the tandem type color printer engine 36 (step S52). When receiving the VSYNC signal, the video control sequencer 41 determines if the HSYNC signal has been sent from the tandem type color printer engine 36 (step S53). Upon reception of the HSYNC signal, the video control sequencer 41 sends the Req signal to the bus arbiter 17 (step S54) and determines if the Ack signal has been sent from the bus arbiter 17 (step S55). When receiving the Ack signal from the bus arbiter 17, the video control sequencer 41 sends the Latch signal to the latch circuit 37. As a result, the latch circuit 37 latches the video data transferred from the video buffer 28 (step S56).

Next, the video control sequencer 41 determines if the parallel-serial conversion of the video data loaded to the parallel-serial converter 38 has been completed (step S57). When determining that the parallel-serial conversion by the parallel-serial converter 38 has been completed, the video control sequencer 41 loads next video data latched in the latch circuit 37 into the parallel-serial converter 38 (step S58).

Then, the video control sequencer 41 determines if the HSYNC signal has ended (step S59). When it is not the end of the HSYNC signal, the video control sequencer 41 returns to step S54 and sends the Req signal to the bus arbiter 17 to get a permission to read next video data from the video buffer 28. when it is the end of the HSYNC signal, the video control sequencer 41 returns to step S53 and waits for the next HSYNC signal being sent from the tandem type color printer engine 36.

Figure 11:
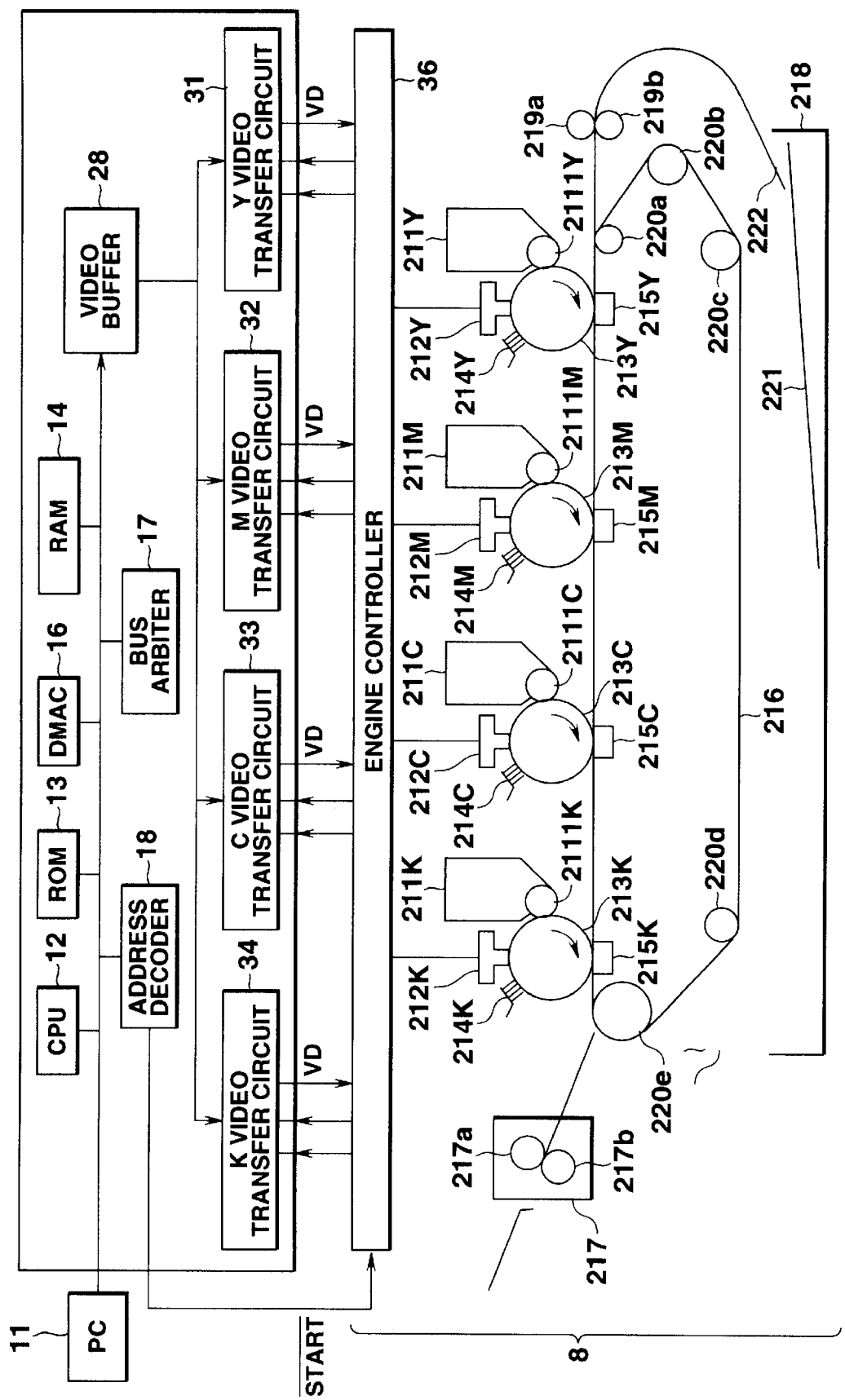
FIG. 11 is a diagram depicting the schematic structure of a printer engine.

The tandem type color printer may be designed to sequentially acquire image data of yellow, magenta, cyan and black and sequentially print the colors represented by the acquired image data on a sheet of paper. FIG. 11 is a side view depicting the schematic structure of a printer engine 8 of a tandem type printer which sequentially acquires image data of yellow, magenta, cyan and black and sequentially prints the colors represented by the acquired image data on a sheet of paper.

In this color printer engine 8, as shown in FIG. 11, a Y drum 213Y for forming a yellow toner image, an M drum 213M for forming a magenta toner image, a C drum 213C for forming a cyan toner image, and a K drum 213K for forming a black toner image are arranged side by side along the advancing direction of a transfer belt 216.

Provided around the Y drum 213Y are a Y charge electrode 214Y, a Y head 212Y, a Y developing unit 211Y, a Y developing roller 2111Y and a Y transfer electrode 215Y. Provided around the M drum 213Y are an M charge electrode 214M, an M head 212M, an M developing unit 211M, an M developing roller 2111M and an M transfer electrode 215M. Provided around the C drum 213C are a C charge electrode 214C, a C head 212C, a C developing unit 211C, a C developing roller 2111C and a C transfer electrode 215C. Provided around the K drum 213K are a K charge electrode 214K, a K head 212K, a K developing unit 211K, a K developing roller 2111K and a K transfer electrode 215K.

The Y charge electrode 214Y, M charge electrode 214M, C charge electrode 214C and K charge electrode 214K, each of which is constituted of, for example, a charge brush, charge the Y drum 213Y, M drum 213M, C drum 213C and K drum 213K. Consequently, the surfaces of the Y drum 213Y, M drum 213M, C drum 213C and K drum 213K are charged.

Each of the Y head 212Y, M head 212M, C head 212C and K head 212K has light-emitting diodes whose quantity is equivalent to the maximum number of pixels in the main scan direction (the widthwise direction of a sheet). As the light-emitting diodes are made to flicker in accordance with the density of an image to be printed, charges on the surfaces of the Y drum 213Y, M drum 213M, C drum 213C and K drum 213K are discharged. Consequently, electrostatic latent images representing the densities of the print image of the respective colors are respectively formed on the surfaces of the Y drum 213Y, M drum 213M, C drum 213C and K drum 213K.

The Y developing unit 211Y, M developing unit 211M, C developing unit 211C and K developing unit 211K respectively retain a yellow toner, a magenta toner, a cyan toner and a black toner. The Y developing unit 211Y adheres the yellow toner on the surface of the Y drum 213Y via the Y developing roller 2111Y. The M developing unit 211M adheres the magenta toner on the surface of the M drum 213M via the M developing roller 2111M. The C developing unit 211C adheres the cyan toner on the surface of the C drum 213C via the C developing roller 2111C. The K developing unit 211K adheres the black toner on the surface of the K drum 213K via the K developing roller 2111K. As a result, a yellow toner image is formed on the surface of the Y drum 213Y, a magenta toner image is formed on the surface of the M drum 213M, a cyan toner image is formed on the surface of the C drum 213C, and a black toner image is formed on the surface of the K drum 213K.

The Y transfer electrode 215Y, M transfer electrode 215M, transfer electrode 215C and K transfer electrode 215K, each of which is constituted of, for example, a transfer brush, apply a transfer current, supplied from a transfer bias power source, to a sheet via the transfer belt 216. The electric field that is generated by the charges carried by the transfer current sequentially transfers on the sheet the yellow toner image formed on the surface of the Y drum 213Y, the magenta toner image formed on the surface of the M drum 213M, the cyan toner image formed on the surface of the C drum 213C and the black toner image formed on the surface of the K drum 213K.

The transfer belt 216 is held by a belt drive roller 220e and driven rollers 220a to 220d. The transfer belt 216 is driven by the belt drive roller 220e in such a way as to be synchronized with the rotations of the Y drum 213Y, the M drum 213M, the C drum 213C and the K drum 213K. The transfer belt 216 carries a sheet 221 to positions at which the sheet 221 can be pressed against the Y drum 213Y, the M drum 213M, the C drum 213C and the K drum 213K, respectively.

A sheet cassette 218, a guide 222, and standby rollers 219a and 219b are provided on the upstream side of the transfer belt 216. The sheet cassette 218 retains sheets 221, the guide 222 guides each sheet 221 onto the transfer belt 216, the standby rollers 219a and 219b control the timing for feeding the sheets 221 to the transfer belt 216.

A fixing unit 217 is provided on the downstream side of the transfer belt 216. The fixing unit 217 has a pressure roller 217a and a melting roller 217b. the melting roller 217b has a fixing heater inside to heat the melting roller 217b. The pressure roller 217a and the melting roller 217b heat the sheet 221 on which a toner image has been transferred, while pressing the sheet 221, thereby thermally fixing the transferred toner image on the sheet 221.

The operation of the tandem type color printer in FIG. 11 will now be discussed.

Upon reception of a print instruction from a host computer, the video data transfer apparatus instructs the engine controller 36 to start the operation. The engine controller 36 feeds the sheet 221, retained in the sheet cassette 218, to the guide 222. The sheet 221 fed to the guide 222 is guided to the standby rollers 219a and 219b along the guide 222. The standby rollers 219a and 219b stand by for the timing for feeding out the sheet 221 to the transfer belt 216.

The engine controller 36 controls the rotation of the belt drive roller 220e to move the transfer belt 216, thus sending the sheet 221, led to the standby rollers 219a and 219b, to the transfer belt 216 at a predetermined timing.

The engine controller 36 activates the Y charge electrode 214Y to charge the surface of the Y drum 213Y. The engine controller 36 sends the vertical sync signal (Y-VSYNC) and horizontal sync signal (Y-HSYNC) to the video data transfer apparatus in such a way as to be synchronous with timing at which the print area of the sheet 221 passes the Y drum 213Y. The video data transfer apparatus reads image data of yellow from the RAM 14, band by band, and stores the image data in the video buffer 28. When one band of image data of yellow is stored in the video buffer 28, the video data transfer apparatus reads this image data from the video buffer 28 and supplies the image data to the engine controller 36. When receiving this image data, the engine controller 36 sends it to the Y head 212Y. The Y head 212Y discharges the charges on the surface of the Y drum 213Y. Consequently, an electrostatic latent image of the image data received from the engine controller 36 is formed on the surface of the Y drum 213Y. The Y developing unit 211Y adheres the yellow toner on the surface of the Y drum 213Y. As a result, a yellow toner image representing the electrostatic latent image formed on the surface of the Y drum 213Y is formed on the surface of the Y drum 213Y.

The engine controller 36 activates the M charge electrode 214M to charge the surface of the M drum 213M. The engine controller 36 sends the vertical sync signal (M-VSYNC) and horizontal sync signal (M-HSYNC) to the video data transfer apparatus in such a way as to be synchronous with timing at which the print area of the sheet 221 passes the M drum 213M. The video data transfer apparatus reads image data of magenta from the RAM 14, band by band, and stores the image data in the video buffer 28. When one band of image data of magenta is stored in the video buffer 28, the video data transfer apparatus reads this image data from the video buffer 28 and supplies the image data to the engine controller 36. When receiving this image data, the engine controller 36 sends it to the M head 212M. The M head 212M discharges the charges on the surface of the M drum 213M. Consequently, an electrostatic latent image of the image data received from the engine controller 36 is formed on the surface of the M drum 213M. The M developing unit 211M adheres the magenta toner on the surface of the M drum 213M. As a result, a magenta toner image representing the electrostatic latent image formed on the surface of the M drum 213M is formed on the surface of the M drum 213M.

The engine controller 36 activates the C charge electrode 214C to charge the surface of the C drum 213C. The engine controller 36 sends the vertical sync signal (C-VSYNC) and horizontal sync signal (C-HSYNC) to the video data transfer apparatus in such a way as to be synchronous with timing at which the print area of the sheet 221 passes the C drum 213C. The video data transfer apparatus reads image data of cyan from the RAM 14, band by band, and stores the image data in the video buffer 28. When one band of image data of cyan is stored in the video buffer 28, the video data transfer apparatus reads this image data from the video buffer 28 and supplies the image data to the engine controller 36. When receiving this image data, the engine controller 36 sends it to the C head 212C. The C head 212C discharges the charges on the surface of the C drum 213C. Consequently, an electrostatic latent image of the image data received from the engine controller 36 is formed on the surface of the C drum 213C. The C developing unit 211C adheres the cyan toner on the surface of the C drum 213C. As a: result, a cyan toner image representing the electrostatic latent image formed on the surface of the C drum 213C is formed on the surface of the C drum 213C.

The engine controller 36 activates the K charge electrode 214K to charge the surface of the K drum 213K. The engine controller 36 sends the vertical sync signal (K-VSYNC) and horizontal sync signal (K-HSYNC) to the video data transfer apparatus in such a way as to be synchronous with timing at which the print area of the sheet 221 passes the K drum 213K. The video data transfer apparatus reads image data of black from the RAM 14, band by band, and stores the image data in the video buffer 28. When one band of image data of black is stored in the video buffer 28, the video data transfer apparatus reads this image data from the video buffer 28 and supplies the image data to the engine controller 36. When receiving this image data, the engine controller 36 sends it to the K head 212K. The K head 212K discharges the charges on the surface of the K drum 213K. Consequently, an electrostatic latent image of the image data received from the engine controller 36 is formed on the surface of the K drum 213K. The K developing unit 211K adheres the black toner on the surface of the K drum 213K. As a result, a black toner image representing the electrostatic latent image formed on the surface of the K drum 213K is formed on the surface of the K drum 213K.

Figure 12:
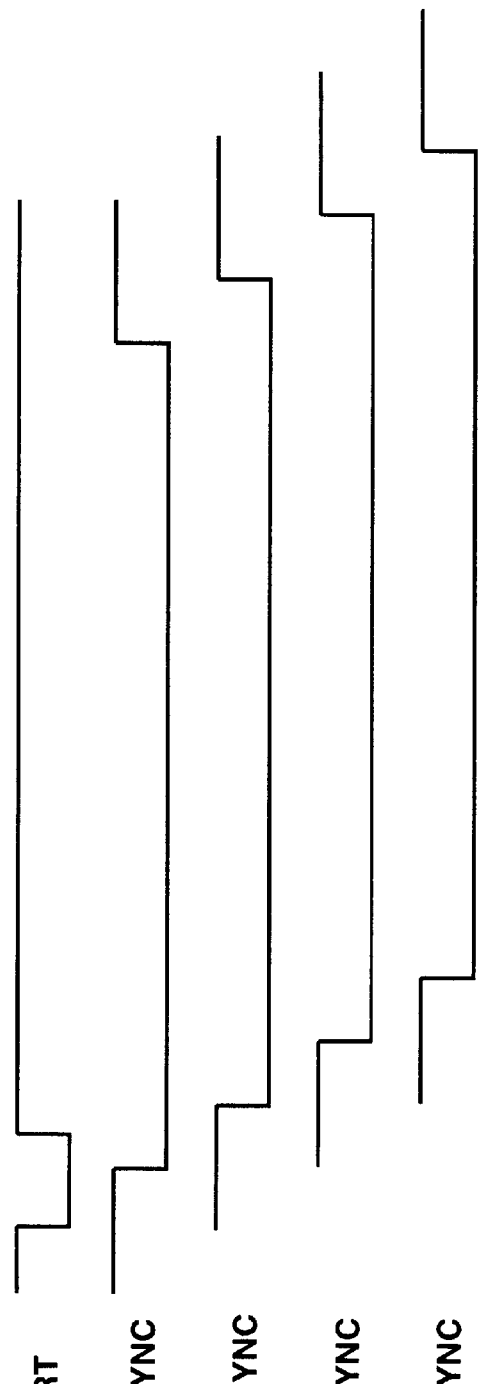
FIG. 12 is a time chart illustrating the timing at which an engine controller outputs a vertical sync signal.

The timings at which the engine controller 36 starts outputting the Y-VSYNC, M-VSYNC, C-VSYNC and K-VSYNC are shown in FIG. 12. As illustrated, after a given time passes from the falling of the START signal representing a print instruction from the host computer, the output of the Y-SYNC starts first. Thereafter, the outputs of the M-VSYNC, C-VSYNC and K-VSYNC sequentially start at given time intervals in the named order. Therefore, colors are printed in the order of yellow, magenta, cyan and black.

Specifically, when the sheet 221 fed by the transfer belt 216 passes between the Y drum 213Y and the Y transfer electrode 215Y, the yellow toner image formed on the surface of the Y drum 213Y is transferred onto the sheet 221. The sheet 221 on which the yellow toner image has been transferred passes between the M drum 213M and the M transfer electrode 215M. At this time, the magenta toner image formed on the surface of the M drum 213M is transferred onto the sheet 221. The sheet 221 on which the yellow and magenta toner images have been transferred passes between the C drum 213C and the C transfer electrode 215C. At this time, the cyan toner image formed on the surface of the C drum 213C is transferred onto the sheet 221. The sheet 221 on which the yellow, magenta and cyan toner images have been transferred passes between the K drum 213K and the K transfer electrode 215K. At this time, the black toner image formed on the surface of the K drum 213K is transferred onto the sheet 221.

When the yellow, magenta, cyan and black toner images are transferred on the sheet 221, the sheet 221 is supplied to the fixing unit 217. The fixing unit 217 thermally fixes the yellow, magenta, cyan and black toner images are transferred on the sheet 221.

Although only one embodiment of the present invention has been described herein, it should be apparent to those skilled in the art that the present invention may be modified in various other forms without departing from the spirit or scope of the invention. For example, although the above-described embodiment is the application of the invention to a tandem type color printer, the invention may be adapted to other types of printers. The function of the address decoder 18 and the function of the bus arbiter 17 may be implemented by the CPU 12.

According to this invention, as described above, since a plurality of video transfer circuits share a single video buffer, an increase in the scale of the circuit which transfers video data, stored in the frame memory, to the printer engine is suppressed.

According to one modification of this invention, the time for reading video data from the frame memory is shortened by providing an address generator for designating video data stored in the frame memory and directly transferring the video data stored in the frame memory to the video buffer. The video data stored in the frame memory is therefore transferred fast to the printer engine.

According to another modification of this invention, when there are a plurality of access requests to the video buffer, once of the access requests is permitted. With this feature, even when the read controller and a plurality of video transfer circuits individually access the video buffer, collision of an access to the video buffer by the read controller and accesses to the video buffer by the video transfer circuits is avoided. Therefore, proper data transfer is carried out even when a single video buffer is shared by a plurality of video transfer circuits.

According to a further modification of this invention, a read end signal is generated when reading of video data from the video buffer is completed, and next video data is written in the video buffer based on this read end signal. This permits video data, stored in the frame memory, to be sequentially supplied to the video buffer. Thus, data transfer to the printer engine is carried out without delay.

What is claimed is:

1. A video data transfer apparatus comprising:
   a frame memory wherein plural pieces of video data stored therein represent images of different colors;
   a video buffer for storing a predetermined amount of video data supplied thereto;
   a reader which reads the video data stored in said frame memory and which represents images of individual colors, color by color, and supplies said read video data to said video buffer;
   a plurality of video transferers which access said video buffer and transfer those of said video data stored in said video buffer which represent images of different colors to a printer engine; and
   an access controller which permits said reader and each of said plurality of video transferers to access said video buffer based on an access request generated by said reader and each of the plurality of video transferers; and
   wherein said reader and each of said video transferers access said video buffer when said access requests are generated and access to said video buffer is permitted.

2. A video data transfer apparatus comprising:
   a frame memory wherein plural pieces of video data stored therein represent images of different colors;
   a video buffer for storing a predetermined amount of video data supplied thereto;
   a reader which reads the video data stored in said frame memory and which represents images of individual colors, color by color, and supplies said read video data to said video buffer;
   a plurality of video transferers which access said video buffer and transfer those of said video data stored in said video buffer which represent images of different colors to a printer engine;
   a read address generator which generates a read address for designating areas of said frame memory from which said video data is to be read out, and
   a write counter which generates a write address for designating areas of said video buffer in which said video data is to be written;
   wherein said reader reads said video data stored in said frame memory which is stored at said area indicated by said read address, and
   said video buffer stores video data supplied thereto in said area indicated by said write address.

3. A video data transfer apparatus comprising:
   a frame memory wherein plural pieces of video data stored therein represent images of different colors;
   a video buffer for storing a predetermined amount of video data supplied thereto;
   a reader which reads the video data stored in said frame memory and which represents images of individual colors, color by color, and supplies said read video data to said video buffer; and
   a plurality of video transferers which access said video buffer and transfer those of said video data stored in said video buffer which represent images of different colors to a printer engine;
   wherein each of said plurality of video transferers has a transfer end signal generator which generates a transfer end signal in response to said predetermined amount of video data having been transferred from said video buffer; and
   said video buffer stores video data supplied thereto based on said transfer end signal.

4. A video data transfer apparatus comprising:
   a frame memory wherein plural pieces of video data stored therein represent images of different colors;
   a video buffer for storing a predetermined amount of video data supplied thereto;
   a reader which reads the video data stored in said frame memory and which represents images of individual colors, color by color, and supplies said read video data to said video buffer; and
   a plurality of video transferers which access said video buffer and transfer those of said video data stored in said video buffer which represent images of different colors to a printer engine;
   wherein for video data representing an image of each color, said printer engine generates a transfer request for said video data; and
   each of said video transferers has means for transferring video data for which said transfer request has been made by said printer engine, to said printer engine in response to said transfer request.

5. A video data transfer apparatus comprising:
   a frame memory wherein plural pieces of video data stored therein represent images of different colors;
   a video buffer for storing a predetermined amount of video data supplied thereto;
   a reader which reads the video data stored in said frame memory and which represents images of individual colors, color by color, and supplies said read video data to said video buffer; and
   a plurality of video transferers which access said video buffer and transfer those of said video data stored in said video buffer which represent images of different colors to a printer engine;
   wherein said video buffer comprises:
      means for securing areas for storing plural pieces of video data representing images of the same colors; and
      a storage device which stores video data, supplied thereto, in an area other than those areas where video data whose transfer by said plurality of video transferers has not been completed yet.

6. A video data transfer apparatus comprising:
   a frame memory wherein plural pieces of video data stored therein represent images of different colors;
   a video buffer for storing a predetermined amount of video data supplied thereto;
   a reader which reads the video data stored in said frame memory and which represents images of individual colors, color by color, and supplies said read video data to said video buffer; and
   a plurality of video transferers which access said video buffer and transfer those of said video data stored in said video buffer which represent images of different colors to a printer engine;

wherein said read controller includes a write detector which detects said video data having been supplied to said video buffer and generates a write end signal; and each of said plurality of video transferers accesses said video buffer in response to said write end signal.

7. A video data transfer apparatus for sequentially transferring each piece of video data representing each color component of an image having a plurality of colors to a printer engine for sequentially generating a transfer request for said each piece of video data and sequentially acquiring said each piece of video data supplied thereto, said apparatus comprising:

a frame memory which stores said each piece of video data representing said each color component;

a video buffer which stores every predetermined amount of video data supplied thereto;

a video transferer which accesses said video buffer and transfers said video data stored in said video buffer to said printer engine in a supply order of said video data to said video buffer, in response to said transfer request generated by said printer engine;

a reader which sequentially reads said video data stored in said frame memory and which represents images of individual colors, color by color, and accesses said video buffer to sequentially supply read video data to said video buffer; and an access controller which permits said reader and each of said video transferers to access said video buffer based on access requests generated by said reader and each video transferer;

wherein said reader and said video transferer access said video buffer when said access requests are generated and access to said video buffer is permitted.

8. A video data transfer apparatus for sequentially transferring each piece of video data representing each color component of an image having a plurality of colors to a printer engine for sequentially generating a transfer request for said each piece of video data and sequentially acquiring said for each piece of video data supplied thereto, said apparatus comprising:

a frame memory which stores said each piece of video data representing said each color component;

a video buffer which stores every predetermined amount of video data supplied thereto;

a video transferer which accesses said video buffer and transfers said video data stored in said video buffer to said printer engine in a supply order of said video data to said video buffer, in response to said transfer request generated by said printer engine;

a reader which sequentially reads said video data stored in said frame memory and which represents images of individual colors, color by color, and accesses said video buffer to sequentially supply read video data to said video buffer;

a read address generator which generates a read address for designating areas of said frame memory from which said video data is to be read out; and a write counter which generates a write address for designating areas of said video buffer in which said video data is to be written;

wherein said reader reads said video data stored in said frame memory which is stored at said area indicated by said read address, and said video buffer stores video data supplied thereto in said area indicated by said write address.

9. A video data transfer apparatus for sequentially transferring each piece of video data representing each color component of an image having a plurality of colors to a printer engine for sequentially generating a transfer request for said each piece of video data and sequentially acquiring said each piece of video data supplied thereto, said apparatus comprising:

a frame memory which stores said each piece of video data representing said each color component;

a video buffer which stores every predetermined amount of video data supplied thereto;

a video transferer which accesses said video buffer and transfers said video data stored in said video buffer to said printer engine in a supply order of said video data to said video buffer, in response to said transfer request generated by said printer engine; and a reader which sequentially reads said video data stored in said frame memory and which represents images of individual colors, color by color, and accesses said video buffer to sequentially supply read video data to said video buffer;

wherein said video transferer has a transfer end signal generator which generates a transfer end signal in response to said predetermined amount of video data having been transferred from said video buffer; and said video buffer stores video data supplied thereto based on said transfer end signal.

10. A video data transfer apparatus for sequentially transferring each piece of video data representing each color component of an image having a plurality of colors to a printer engine for sequentially generating a transfer request for said each piece of video data and sequentially acquiring said each piece of video data supplied thereto, said apparatus comprising:

a frame memory which stores said each piece of video data representing said each color component;

a video buffer which stores every predetermined amount of video data supplied thereto;

a video transferer which accesses said video buffer and transfers said video data stored in said video buffer to said printer engine in a supply order of said video data to said video buffer, in response to said transfer request generated by said printer engine; and a reader which sequentially reads said video data stored in said frame memory and which represents images of individual colors, color by color, and accesses said video buffer to sequentially supply read video data to said video buffer;

wherein said video buffer comprises:

means for securing areas for storing plural pieces of video data representing images of the same colors; and a storage device which stores video data, supplied thereto, in an area other than those areas where video data whose transfer by said video transfer has not been completed yet.

11. A video data transfer apparatus for sequentially transferring each piece of video data representing each color component of an image having a plurality of colors to a printer engine for sequentially generating a transfer request for said each piece of video data and sequentially acquiring said each, piece of video data supplied thereto, said apparatus comprising:

a frame memory which stores said each piece of video data representing said each color component;

a video buffer which stores every predetermined amount of video data supplied thereto;

a video transferer which accesses said video buffer and transfers said video data stored in said video buffer to said printer engine in a supply order of said video data to said video buffer, in response to said transfer request generated by said printer engine; and a reader which sequentially reads said video data stored in said frame memory and which represents images of individual colors, color by color, and accesses said video buffer to sequentially supply read video data to said video buffer;

wherein said read controller includes a write detector which detects said video data having been supplied to said video buffer and generates a write end signal; and each of said video transferers access said video buffer in response to said write end signal.

12. A video data transfer apparatus for sequentially transferring each piece of video data representing each color component of an image having a plurality of colors to a printer engine for sequentially generating a transfer request for said each piece of video data and sequentially acquiring said each piece of video data supplied thereto, said apparatus comprising:

a frame memory which stores said each piece of video data representing said each color component;

a video buffer which stores every predetermined amount of video data supplied thereto;

a video transferer which accesses said video buffer and transfers said video data stored in said video buffer to said printer engine in a supply order of said video data to said video buffer, in response to said transfer request generated by said printer engine;

a reader which sequentially reads said video data stored in said frame memory and which represents images of individual colors, color by color, and accesses said video buffer to sequentially supply read video data to said video buffer; and means for supplying a signal instructing a start of transfer of said video data to said printer engine;

wherein when said printer engine receives said instruction. signal, said printer engine starts an operation for generating a transfer request in response to said signal.

13. A video data transfer apparatus for transferring video data representing an image to a printer engine from a frame memory having an area for storing said video data, comprising:

a read address generator which generates a read address for designating areas of said frame memory from which said video data is to be read out;

a video buffer having an area for storing a predetermined amount of video data;

a write counter which generates a write address for designating areas of said video buffer in which said video data is to be written;

a write controller which, when generating an access request to said video buffer and access permission is granted, reads video data from said area in said frame memory indicated by said read address and writes read video data in said area in said video buffer indicated by said write address;

a read controller which, when generating an access request to said video buffer and access permission is granted, reads said video data from said video buffer;

a read end signal generator which generates a read end signal in response to reading of said predetermined amount of video data from said video buffer by said read controller;

a transferer which transfers said video data read by said read controller to said printer engine;

a write instructor which generates an instruction to write next video data in said video buffer with respect to said write controller based on said read end signal; and an access controller which grants access to one of said write controller and said read controller which have generated said access requests to said video buffer, said write controller includes a request-generator which generates said access request to said video buffer in response to said instruction generated by said write instructor.

14. The video data transfer apparatus according to claim 13, wherein for video data representing an image of each color, said printer engine generates a transfer request for said video data; and said read address generator generates a read address for designating areas of said frame memory where said video data targeted by said transfer request generated by said printer engine is stored, in response to said transfer request.

15. The video data transfer apparatus according to claim 13, wherein said write controller generates a write end signal in response to said predetermined amount of video data having been written in said video buffer; and said read controller generates an access request to said video buffer in response to said write end signal.

16. A video data transfer method of transferring video data representing an image to a printer engine from a frame storage having an area for storing said video data, comprising the steps of:

a read address generation step of generating a read address for designating areas of said frame storage from which said video data is to be read out;

a buffer step of storing a predetermined amount of video data in a buffer memory;

a write counter step of generating a write address for designating areas of said buffer memory in which said video data is to be written;

a write control step of, when generating an access request and access permission is granted, reading video data from said area in said frame storage indicated by said read address and writing said read video data in said area in said buffer memory indicated by said write address;

a read control step of, when generating an access request to said buffer step and access permission is granted, reading said video data from said buffer memory;

a read end signal generation step of generating a read end signal in response to reading of said predetermined amount of video data;

a transfer step of transferring said video data read in said read control step to said printer engine;

a write instruction step of generating an instruction to write next video data in said buffer step with respect to said write control step based on said read end signal; and an access control step of granting access permission to one of said write control step and said read control step which have generated said access requests to said buffer step, said write control step having a step of generating said access request to said buffer step in response to said instruction generated by said write instruction step.

* * * * *